(12) United States Patent
Nomoto et al.

(10) Patent No.: US 9,042,021 B2
(45) Date of Patent: May 26, 2015

(54) OPTICAL ELEMENT, HEAD-UP DISPLAY AND LIGHT SOURCE UNIT

(75) Inventors: Takayuki Nomoto, Kawagoe (JP); Ikuya Kikuchi, Tokyo (JP)

(73) Assignee: PIONEER CORPORATION, Kanagawa (JP)

( * ) Notice: Subject to any disclaimer, the term of this patent is extended or adjusted under 35 U.S.C. 154(b) by 0 days.

(21) Appl. No.: 14/111,987

(22) PCT Filed: Apr. 14, 2011

(86) PCT No.: PCT/JP2011/059281
§ 371 (c)(1),
(2), (4) Date: Oct. 30, 2013

(87) PCT Pub. No.: WO2012/140765
PCT Pub. Date: Oct. 18, 2012

(65) Prior Publication Data
US 2014/0055864 A1 Feb. 27, 2014

(51) Int. Cl.
*G02B 27/14* (2006.01)
*G02B 27/10* (2006.01)
*G02B 3/00* (2006.01)
*G02B 27/01* (2006.01)
*G02B 27/48* (2006.01)

(52) U.S. Cl.
CPC .............. *G02B 3/005* (2013.01); *G02B 3/0006* (2013.01); *G02B 27/0101* (2013.01); *G02B 27/48* (2013.01); *G02B 2027/0118* (2013.01); *G02B 3/0056* (2013.01)

(58) Field of Classification Search
USPC .......................................... 359/630–639, 619
See application file for complete search history.

(56) References Cited

U.S. PATENT DOCUMENTS

| | | | |
|---|---|---|---|
| 6,144,426 A | 11/2000 | Yamazaki et al. | |
| 6,513,953 B1 | 2/2003 | Itoh | |
| 6,643,067 B2 * | 11/2003 | Miyamae et al. | 359/619 |
| 6,678,023 B1 | 1/2004 | Yamazaki et al. | |
| 7,154,675 B2 * | 12/2006 | Ishikawa et al. | 359/622 |
| 7,253,958 B2 * | 8/2007 | Aizenberg et al. | 359/619 |

(Continued)

FOREIGN PATENT DOCUMENTS

| | | |
|---|---|---|
| JP | 08-16656 | 1/1996 |
| JP | 11-183867 | 7/1999 |

(Continued)

OTHER PUBLICATIONS

International Search Report, PCT/JP2011/059281, Jun. 14, 2011.

(Continued)

*Primary Examiner* — Mohammed Hasan
(74) *Attorney, Agent, or Firm* — Young & Thompson

(57) ABSTRACT

An optical element includes a first microlens array unit and a second microlens array unit in each of which a plurality of microlenses are arranged. The first and second microlens array units are arranged opposite to each other with a distance which is longer than a focal length of the microlenses arranged in the first microlens array unit. The first microlens unit is arranged on a light-incident side with respect to the second microlens array unit. The interval between the microlenses arranged in the second microlens array unit is narrower than the interval between the microlenses arranged in the first microlens array unit. The optical element can appropriately suppress the occurrence of excessive pixel bright spot.

16 Claims, 18 Drawing Sheets

(56) References Cited

U.S. PATENT DOCUMENTS

| | | | |
|---|---|---|---|
| 8,310,760 B2 * | 11/2012 | Steenblik et al. | ............ 359/619 |
| 2001/0028506 A1 | 10/2001 | Fujimoto et al. | |

FOREIGN PATENT DOCUMENTS

| | | |
|---|---|---|
| JP | 11-271669 | 10/1999 |
| JP | 2000-241769 | 9/2000 |
| JP | 2001-352429 | 12/2001 |
| JP | 2005-338325 | 12/2005 |
| JP | 2007-523369 | 8/2007 |
| JP | 2010-145745 | 7/2010 |
| JP | 2010-277065 | 12/2010 |
| WO | WO 2005/078511 | 8/2005 |

OTHER PUBLICATIONS

H. Urey et al., "Micron-array-based exit-pupil expander for full-color displays", Applied Optics vol. 44, No. 23, p. 4930-4936, Jun. 2011.

* cited by examiner

INCIDENT LIGHT

ROTATED BY 30 DEGREES

OPTICAL ELEMENT, HEAD-UP DISPLAY AND LIGHT SOURCE UNIT

TECHNICAL FIELD

The present invention relates to an optical element using microlens arrays.

BACKGROUND TECHNIQUE

Conventionally, there is proposed a technique of applying a transmission type screen using microlens arrays to a head-up display and a laser projector. In case of using such a transmission type screen, there is such an advantage that influence by speckle noise can be suppressed, in comparison the case of using a diffuser panel. For example, Patent Reference 1 proposes an image forming apparatus which uses a laser light as a light source, and which includes a laser projector for projecting an image formed by arranging a plurality of pixels, and a microlens array of a plurality of arranged microlens. In case of using the microlens array, the incident light can be appropriately dispersed and necessary diffusion angle can be freely designed.

On the other hand, Patent Reference 2, Patent Reference 3 and Non-Patent Reference 1 propose configuring a screen by two microlens arrays or two diffraction gratings, for example. Particularly, Non-Patent Reference 1 discloses that uneven luminance tends to occur when a single microlens array is used, but such uneven luminance can be suppressed by using two microlens arrays.

PRECEDING TECHNICAL DOCUMENTS

Patent References

Patent Reference 1: Japanese Patent Application Laid-open under No. 2010-145745
Patent Reference 2: Japanese Patent Application Laid-open under No. 08-16656
Patent Reference 3: Japanese Patent Application Laid-open under No. 2007-523369

Non-Patent Reference

Non-Patent Reference 1: H. Urey and K. D. Powell, "Microlens-array-based exit-pupil expander for full-color displays", APPLIED OPTICS Vol 0.44, No. 23, p. 4930-4936

DISCLOSURE OF INVENTION

Problem to be Solved by the Invention

By the way, when a microlens array is applied to a laser scan type light source, for example, an image (hereinafter referred to as "intermediate image") whose pixel positions coincide with the focal points of the respective microlens of the microlens array. In this case, since the light source is laser, the focusing characteristic is high at the focal points of the microlens array. Therefore, at the intermediate image plane by the microlens array, the pixels formed by the respective microlenses (i.e., the pixels corresponding to the focal points of the microlenses) become separated state. In other words, bright luminance parts and dark luminance parts clearly appear on the intermediate image plane. Accordingly, when the intermediate image formed by the microlens array is magnified and displayed, there is a possibility that the pixels formed by the respective microlenses of the microlens array become conspicuous as excessive bright spots (hereinafter referred to as "pixel bright spot"). Patent References 1 to 3 and Non-Patent Reference 1 mentioned above do not disclose how to suppress such excessive pixel bright spots.

The above is an example of a problem to be solved by the present invention. It is an object of the present invention to provide an optical element, a head-up display and a light source unit, capable of appropriately suppressing excessive pixel bright spots in a configuration using a microlens array.

Means for Solving the Problem

In one invention, an optical element includes a first microlens array unit and a second microlens array unit in which plural microlenses are arranged, wherein the first microlens array unit and the second microlens array unit are arranged opposite to each other with a distance longer than a focal length of the microlenses arranged in the first microlens array unit, wherein an interval of the microlenses arranged in the second microlens array unit is narrower than an interval of the microlenses arranged in the first microlens array unit, and wherein the first microlens array unit is arranged on a light-incident side with respect to the second microlens array unit.

In another invention, a head-up display includes the above optical element, and makes a user view an image formed by the optical element from a position of eyes of the user as a virtual image.

In another invention, a light source unit includes: a light source; a first microlens array in which plural microlenses are arranged with a predetermined interval; and a second microlens array in which plural microlenses are arranged with an interval narrower than the predetermined interval, wherein the second microlens array is arranged apart from the first microlens array by a distance longer than a focal length of the microlenses arranged in the first microlens array, and wherein the first microlens array is arranged on a light-incident side of a light emitted by the light source with respect to the second microlens array.

FORMS TO EXERCISE THE INVENTION

Figure 1:
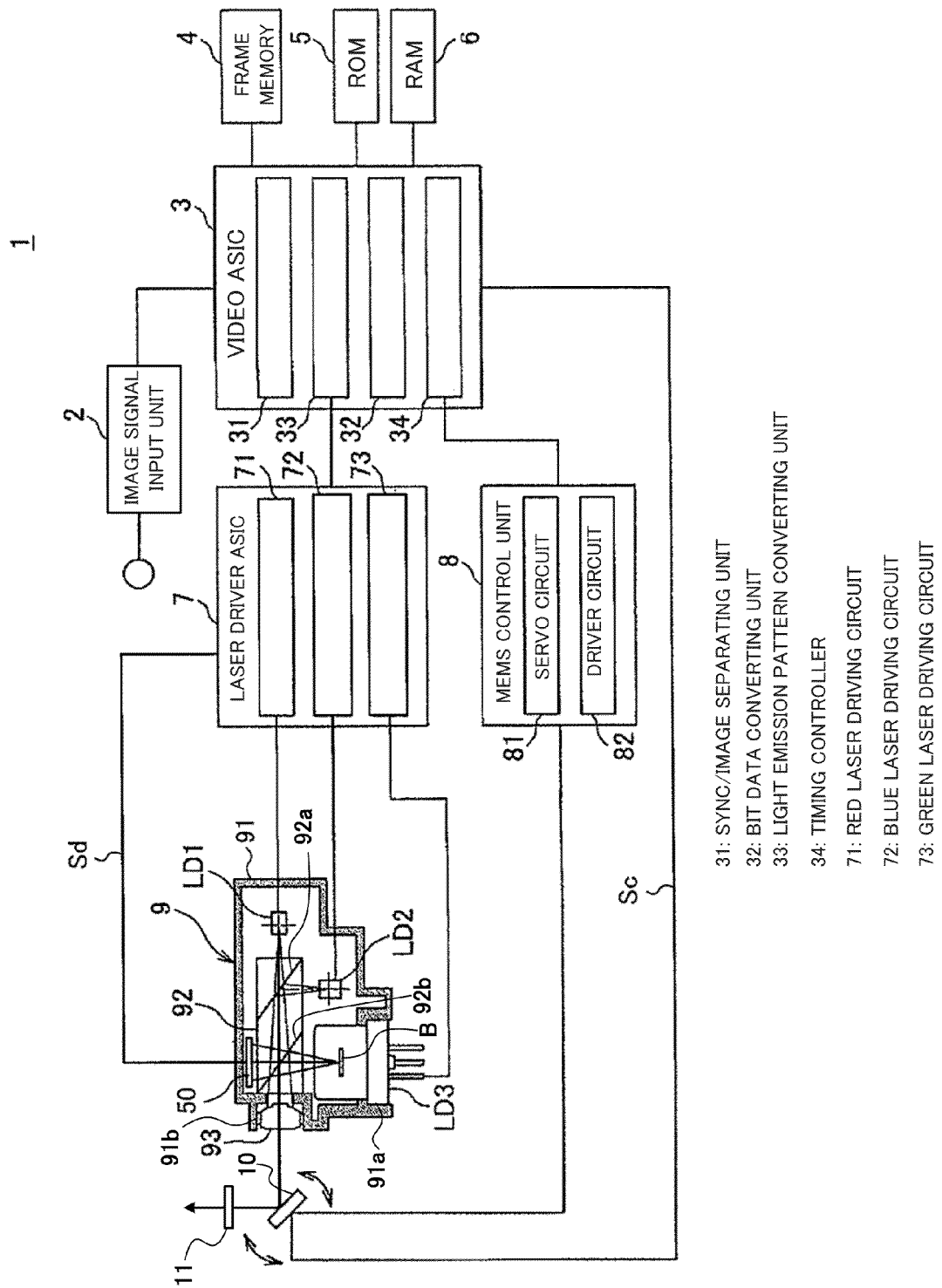
FIG. 1 shows a configuration of an image display apparatus according to an embodiment.

According to one aspect of the present invention, there is provided an optical element including a first microlens array unit and a second microlens array unit in which plural microlenses are arranged, wherein the first microlens array unit and the second microlens array unit are arranged opposite to each other with a distance longer than a focal length of the microlenses arranged in the first microlens array unit, wherein an interval of the microlenses arranged in the second microlens array unit is narrower than an interval of the microlenses arranged in the first microlens array unit, and wherein the first microlens array unit is arranged on a light-incident side with respect to the second microlens array unit.

The above optical element includes first and second microlens array units, in each of which a plurality of microlenses are arranged. The optical element corresponds to a screen in other words. The first and second microlens array units are arranged opposite to each other with a distance which is longer than a focal length of the microlenses arranged in the first microlens array unit. The first microlens array unit is arranged on the light-incident side with respect to the second microlens array unit. Also, the first and second microlens array units are configured such that the interval between the microlenses arranged in the second microlens array unit is narrower than the interval between the microlenses arranged in the first microlens array unit. Namely, the lens pitch of the microlenses in the second microlens array unit is smaller than the lens pitch of the microlenses in the first microlens array unit. In other words, the lens diameter of one microlens in the second microlens array unit is smaller than the lens diameter of one microlens in the first microlens array unit.

According to the above optical element, the light focused by one microlens in the first microlens array unit enters two or more microlenses in the second microlens array unit. Thereby, one pixel formed by one microlens in the first microlens array unit is divided by two or more microlenses in the second microlens array unit to form two or more pixels (divided pixels). The interval between the divided pixels is equal to the lens pitch in the second microlens array unit, which is smaller than the lens pitch in the first microlens array unit. On the other hand, by using the second microlens array unit, the focusing characteristic by every pixel is expanded. Thus, the above optical element can make the separation of the pixels inconspicuous. Namely, the pixel bright spot can be inconspicuous. Therefore, the optical element can appropriately suppress the occurrence of the excessive pixel bright spots when the intermediate image by the second microlens array unit is magnified and displayed.

In one mode of the above optical element, the intervals between the microlenses arranged in the first microlens array unit and the second microlens array unit are set such that alight focused by one microlens in the first microlens array unit is incident on and divided by two or more microlenses in the second microlens array unit.

In the above optical element, the intervals between the microlenses arranged in the first microlens array unit and the second microlens array unit are set such that a light focused by one microlens in the first microlens array unit is incident on and divided by two or more microlenses in the second microlens array unit. Thereby, it is possible to appropriately suppress the occurrence of the excessive pixel bright spots.

In another mode of the above optical element, the interval between the microlenses arranged in the second microlens array unit is equal to or smaller than ½ of the interval between the microlenses arranged in the first microlens array unit. Thereby, it is possible to effectively suppress the occurrence of the excessive pixel bright spots.

Preferably, the interval between the microlenses is an interval between centers of gravity of neighboring microlenses. In other words, the interval between the microlenses is a distance between the centers of the neighboring microlenses.

Preferably, in the above optical element, the first microlens array unit and the second microlens array unit are arranged opposite to each other at positions apart from each other by a distance which is equal to or larger than 1.5 times and equal to or smaller than 3 times of the focal length of the microlenses arranged in the first microlens array unit.

In still another mode of the above optical element, the plural microlenses are formed to have a lens contour of a polygon shape in a plan view, and the first microlens array unit and the second microlens array unit are configured such that a vertex direction of the lens contour of the microlenses arranged in the first microlens array unit is shifted by a certain angle from a vertex direction of the lens contour of the microlenses arranged in the second microlens array unit.

In the above optical element, the first and second microlens array units are configured such that the angle difference between the vertex direction of the polygon shape which is a lens contour of the microlenses arranged in the first microlens array unit and the vertex direction of the polygon shape which is a lens contour of the microlenses arranged in the second microlens array unit is a predetermined angle. Namely, the plural microlenses are arranged in the first and second microlens array units such that the polygon shapes, which are the lens contours, are rotated by the predetermined angle relative to each other. According to the above optical element, it is possible to suppress unnecessary interference by the polygon shape image appearing at the incident plane, and it is possible to appropriately suppress the influence by the positional deviation of the first and second microlens array units. Also, according to the above optical element, since it is unnecessary to strictly adjust the positions of the first and second microlens array units, the optical element can be produced easily with low cost.

In still another mode of the above optical element, the polygon shape is a regular hexagon shape, and an angle difference between the vertex direction of the lens contour of the microlenses arranged in the first microlens array unit and the vertex direction of the lens contour of the microlenses arranged in the second microlens array unit is substantially 30 degrees or 90 degrees. In this mode, the influence by the positional deviation of the first and second microlens array units can be effectively suppressed.

In still another mode of the above optical element, the polygon shape is a square shape, and an angle difference between the vertex direction of the lens contour of the microlenses arranged in the first microlens array unit and the vertex direction of the lens contour of the microlenses arranged in the second microlens array unit is substantially 45 degrees or 135 degrees. In this mode, the influence by the positional deviation in the first and second microlens array units can be effectively suppressed.

In still another mode of the above optical element, each of the plural microlenses has the lens contour of a regular polygon in a plan view, and the first microlens array unit and the second microlens array unit are configured such that the vertex direction of the lens contour of the microlenses arranged in the first microlens array unit and the vertex direction of the lens contour of the microlenses arranged in the second microlens array unit are shifted from each other by ½ of an interior angle of the regular polygon. Also in this mode, the influence by the positional deviation of the first and second microlens array units can be effectively suppressed.

In still another mode of the above optical element, the plural microlenses are arranged with equal intervals in the first microlens array unit and the second microlens array unit, the microlenses are arranged such that one microlens is surrounded by plural microlenses at every predetermined angle with respect to vertexes of said one microlens, and the microlenses arranged in the first microlens array unit and the microlenses arranged in the second microlens array unit are shifted by a half of the predetermined angle with respect to said one microlens. Also in this mode, the influence by the positional deviation of the first and second microlens array units can be effectively suppressed. In the above optical element, it is preferred that spaces between the microlenses in the first microlens array unit and the second microlens array unit are masked to be intransparent.

Still another mode of the above optical element includes a first lens array including the first microlens array unit on one surface; and a second lens array including the second microlens array unit on one surface. Namely, the first and second microlens array units are separately formed, and the plural microlenses are formed on one side of them, respectively.

Preferably, the first microlens array unit and the second microlens array unit are formed on the surfaces of the first lens array and the second lens array opposite to each other. Namely, in the first and second microlens array units, the plural microlenses are formed on their opposite surfaces.

Preferably, the first microlens array unit is formed on one of the surfaces of the first lens array that is not opposite to the surface of the second lens array on which the second microlens array unit is formed. Namely, in one of the first and second microlens array units, the plural microlenses are formed on the surface opposite to the other one of the first and second microlens array units. In the other one of the first and second microlens array units, the plural microlenses are formed on the back surface of the surface opposite to said one of the first and the second microlens array units.

Preferably, the first microlens array unit and the second microlens array unit are formed on the surfaces of the first lens array and the second lens array not opposite to each other. Namely, in the first and second microlens array units, the plural microlenses are formed on the back surface of the surface opposite to each other.

In still another mode of the above optical element, the first microlens array unit is formed on one surface and the second microlens array unit is formed on the other surface. In other words, the first and second microlens array units are formed integrally as a single unit, and the plural microlenses are formed on both of the opposite surfaces of the optical element. In this mode, since two microlens array units are formed as a single unit, it is only necessary to produce one constitutional element formed with the microlens arrays. Hence, the cost required for the optical element can be reduced.

The above optical element can be preferably applied to a head-up display which makes a user view an image formed by the optical element from a position of eyes of the user as a virtual image.

According to another aspect of the present invention, there is provided a light source unit including: a light source; a first microlens array in which plural microlenses are arranged with a predetermined interval; and a second microlens array in which plural microlenses are arranged with an interval narrower than the predetermined interval, wherein the second microlens array is arranged apart from the first microlens array by a distance longer than a focal length of the microlenses arranged in the first microlens array, and wherein the first microlens array is arranged on a light-incident side of a light emitted by the light source with respect to the second microlens array. Also by the above light source unit, the occurrence of the excessive pixel bright spots can be appropriately suppressed.

Embodiments

Preferred embodiments of the present invention will be described below with reference to the attached drawings.

[Configuration of Image Display Apparatus]

FIG. 1 shows a configuration of an image display apparatus to which an optical element according to the embodiment is applied. As shown in FIG. 1, the image display apparatus 1 includes an image signal input unit 2, a video ASIC 3, a frame memory 4, a ROM 5, a RAM 6, a laser driver ASIC 7, a MEMS control unit 8, a laser light source unit 9, a MEMS mirror 10 and a screen 11.

The image display apparatus 1 is applied to a head-up display, for example. The head-up display is an apparatus which makes a driver view an image from the position of his eyes (eye point) as a virtual image.

The image signal input unit 2 receives the image signal inputted from outside and outputs it to the video ASIC 3.

The video ASIC 3 is a block which controls the laser driver ASIC 7 and the MEMS control unit 8 based on the image signal inputted from the image signal input unit 2 and the scanning position information Sc inputted from the MEMS mirror 10. The video ASIC 3 is configured as an ASIC (Application Specific Integrated Circuit). The video ASIC 3 includes a sync/image separating unit 31, a bit data converting unit 32, an emission pattern converting unit 33 and a timing controller 34.

The sync/image separating unit 31 separates the image data to be displayed on the screen serving as an image displaying unit and the synchronization signal from the image signal inputted from the image signal input unit 2, and writes the image data into the frame memory 4.

The bit data converting unit 32 reads out the image data written in the frame memory 4 and converts it to the bit data.

The emission pattern converting unit 33 converts the bit data converted by the bit data converting unit 32 to the signal indicating the emission pattern of each of the lasers.

The timing controller 34 controls the operation timings of the sync/image separating unit 31 and the bit data converting unit 32. The timing controller 34 also controls the operation timing of the MEMS control unit 8 described later.

Into the frame memory 4, the image data separated by the sync/image separating unit 31 is written. The ROM 5 stores control program and data necessary for the operation of the video ASIC 3. The RAM 6 serves as a work memory for the operation of the video ASIC, and various data is sequentially written into and read from the RAM 6.

The laser driver ASIC 7 is a block for generating signals to drive the laser diodes provided in the laser light source unit 9 described later, and is configured as an ASIC. The laser driver ASIC 7 includes a red laser driving circuit 71, a blue laser driving circuit 72 and a green laser driving circuit 73.

The red laser driving circuit 71 drives the red laser LD1 based on the signal outputted by the emission pattern converting unit 33. The blue laser driving circuit 72 drives the blue laser LD2 based on the signal outputted by the emission pattern converting unit 33. The green laser driving circuit 73 drives the green laser LD3 based on the signal outputted by the emission pattern converting unit 33.

The MEMS control unit 8 controls the MEMS mirror 10 based on the signal outputted by the timing controller 34. The MEMS control unit 8 includes a servo circuit 81 and a driver circuit 82.

The servo circuit 81 controls the operation of the MEMS mirror 10 based on the signal from the timing controller 34.

The driver circuit 82 amplifies the control signal of the MEMS mirror 10 outputted by the servo circuit 81 to a predetermined level and outputs it.

The laser light source unit 9 emits the laser light to the MEMS mirror 10 based on the driving signal outputted by the laser driver ASIC 7.

The MEMS mirror 10 serving as a scanning means reflects the laser light emitted by the laser light source unit 9 to the screen 11. By this, the MEMS mirror 10 forms the display image on the screen 11. Also, the MEMS mirror 10 moves to scan the screen 11 under the control of the MEMS control unit 8 so as to display the image inputted to the image signal input unit 2, and outputs the scanning position information (e.g., information such as the angle of the mirror) to the video ASIC 3.

The screen 11 is an example of the "optical element" according to the present invention. The screen 11 is configured as a transmission type screen, and includes microlens array units (not shown) in which a plurality of microlenses are arranged. The microlens array unit disperses the incident light to an appropriate degree. Specifically, the microlens array unit diffuses the light by the diffusion angle in accordance with the curvature of the lens. The curvature of the lens in the microlens array unit is designed in advance in accordance with the necessary diffusion angle. The screen 11 will be described later in detail.

Actually, the image display apparatus 1 makes the driver view the image, corresponding to the light emitted by the screen 11 and then reflected by the reflecting mirror (combiner) or magnified by the magnifying element, from the position of the eyes (eye point) of the driver as the virtual image.

Next, the detailed configuration of the laser light source unit 9 will be described. The laser light source unit 9 includes a casing 91, a wavelength selective element 92, a collimator lens 93, a red laser LD1, a blue laser LD2, a green laser LD3 and a monitoring-purpose light receiving element (hereinafter simply referred to as "light receiving element") 50.

The casing 91 is formed of resin into a substantially box shape. The casing 91 is formed with a CAN attaching part 91a and a collimator attaching part 91b. In order to attach the green laser LD3, the CAN attaching part 91a has a concave sectional shape and formed with a hole communicating with the inside of the casing 91. The collimator attaching part 91b is provided on a surface perpendicular to the CAN attaching part 91a, has a concave sectional shape, and is formed with a hole communicating with the inside of the casing 91.

The wavelength selective element 92 serving as a synthesizing element is configured by a trichroic prism, for example, and formed with a reflecting surfaces 92a and 92b. The reflecting surface 92a transmits the laser light emitted by the red laser LD1 to the collimator lens 93, and reflects the laser light emitted by the blue laser LD2 to the collimator lens 93. The reflecting surface 92b transmits a major part of the laser light emitted by the red laser LD1 and the blue laser LD2 to the collimator lens 93, and reflects a part of those laser lights to the light receiving element 50. In addition, the reflecting surface 92b reflects a major part of the laser light emitted by the green laser LD3 to the collimator lens 93, and transmits a part of the same laser light to the light receiving element 50. Thus, the lights emitted by those lasers are overlapped and incident upon the collimator lens 93 and the light receiving element 50. The wavelength selective element 92 is provided adjacent to the collimator attaching part 91b in the casing 91.

The collimator lens 93 outputs the laser light incident from the wavelength selective element 92 to the MEMS mirror 10 as a parallel light. The collimator lens 93 is fixed to the collimator attaching part 91b of the casing 91 by UV adhesive. Namely, the collimator lens 93 is provided behind the synthesizing element.

The red laser LD1 serving as a laser light source emits the red laser light. The red laser LD1 is fixed at a position on the same axis as the wavelength selective element 92 in the casing 91 and the collimator lens 93, in such a manner that the semiconductor laser light source is in the chip state or the chip is disposed on a sub-mount.

The blue laser LD2 serving as a laser light source emits the blue laser light. The blue laser LD2 is fixed at a position that enables the emitted laser light to be reflected by the reflecting surface 92a to the collimator lens 93, in such a manner that the semiconductor laser light source is in the chip state or the chip is disposed on a sub-mount. The positions of the red laser LD1 and the blue laser LD2 may be exchanged.

The green laser LD3 serving as a laser light source is in a state being attached to the CAN package or the frame package, and emits the green laser light. A semiconductor laser light source chip B emitting the green laser light is attached in the CAN package of the green laser LD3, and the green laser LD3 is fixed at the CAN attaching part 91a of the casing 91.

The light receiving element 50 receives a part of the laser light emitted by each of the laser light sources. The light receiving element 50 is a photoelectric converting element, and supplies a detection signal Sd, which is an electric signal in accordance with the light quantity of the incident laser light, to the laser driver ASIC 7. Actually, at the time of power adjustment, one of the red laser light, the blue laser light and the green laser light is irradiated on the light receiving element 50 in turn, and the light receiving element 50 outputs the detection signal Sd corresponding to the light quantity of the laser light. The laser driver ASIC 7 performs the power adjustment of the red laser LD1, the blue laser LD2 and the green laser LD3 in accordance with the detection signal Sd.

For example, when the power of the red laser LD1 is adjusted, the laser driver ASIC 7 only operates the red laser driving circuit 71, and supplies the driving current to the red laser LD1 to make the red laser LD1 emit the red laser light. A part of the red laser light is received by the light receiving element 50, and the detection signal Sd corresponding to the received light quantity is fed back to the laser driver ASIC 7. The laser driver ASIC 7 adjusts the driving current supplied from the red laser driving circuit 71 to the red laser LD1 such that the light quantity indicated by the detection signal Sd becomes an appropriate light quantity. Thus, the power adjustment is performed. The power adjustment of the blue laser LD2 and the green laser LD3 are performed in the same manner.

It is noted that a component including at least the laser light source unit 9 and the screen 11 as described above corresponds to an example of the "light source unit" according to the present invention.

[Configuration of Screen]

Next, the configuration of the screen 11 according to the embodiment will be specifically described. As mentioned above, the screen 11 is an example of the "optical element" according to the present invention.

Figure 2:
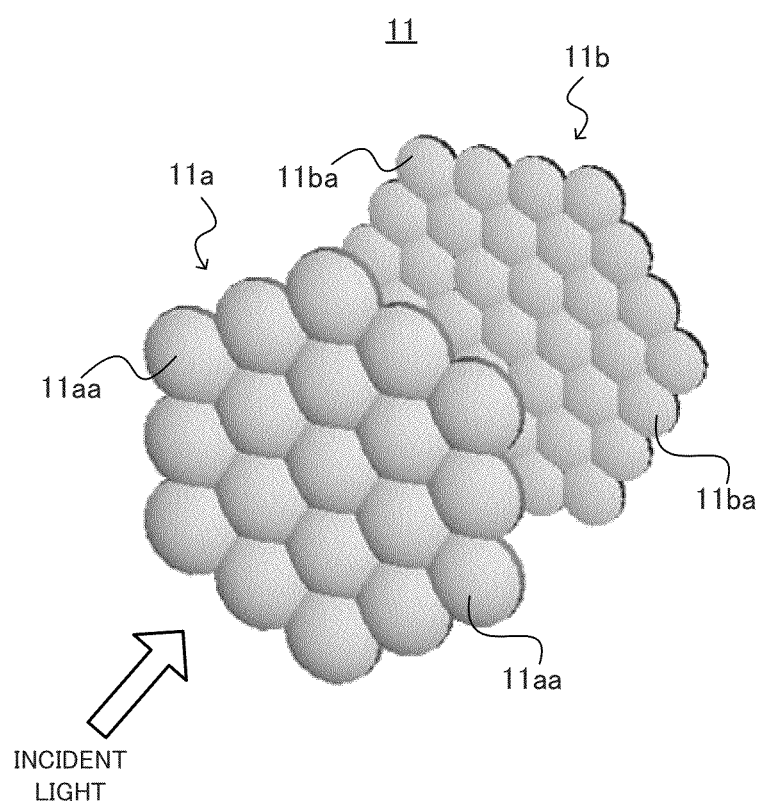
FIG. 2 shows a perspective view of a screen according to the embodiment.

FIG. 2 is a perspective view of the screen 11 according to this embodiment. As shown in FIG. 2, the screen 11 includes a first microlens array unit 11a and a second microlens array unit 11b, arranged opposite to each other with a predetermined interval therebetween. The first microlens array unit 11a and the second microlens array unit 11b are formed in a substantially disk shape, respectively. The first microlens array unit 11a and the second microlens array unit 11b are formed with a plurality of microlenses 11a and 11b, each having a lens contour of a regular hexagon shape in a planar view, on one side surface thereof, respectively.

Further, as shown in FIG. 2, the first microlens array unit 11a is arranged on the light incident side, and the second microlens array unit 11b is arranged on the light exit side. Namely, first the light enters the first microlens array unit 11a, and the light exited the first microlens array unit 11a enters the second microlens array unit 11b.

Figure 3A:
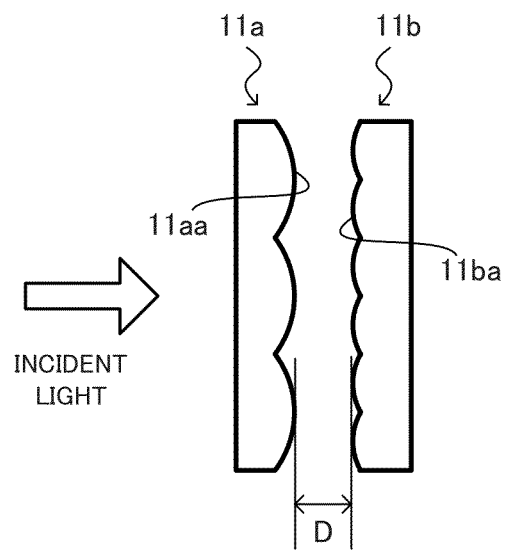
FIGS. 3A and 3B show a configuration of first and second microlens array units according to the embodiment.
Figure 3B:
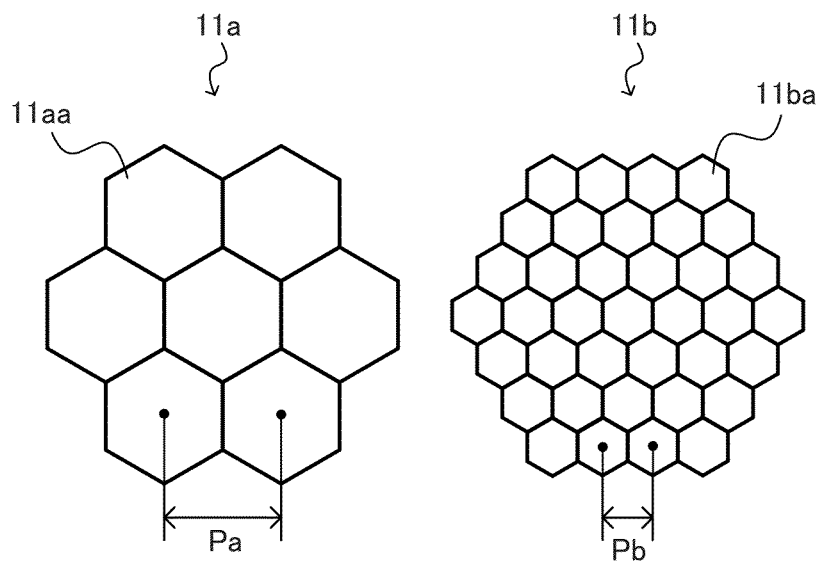

FIGS. 3A and 3B shows the specific configuration of the first microlens array unit 11a and the second microlens array unit 11b according to the embodiment. FIG. 3A is a sectional view of the first microlens array unit 11a and the second microlens array unit 11b cut along a plane perpendicular to the advancing direction of the light. Specifically, FIG. 3A shows a sectional view of a magnified part of the first microlens array unit 11a and the second microlens array unit 11b. As shown in FIG. 3A, the first microlens array unit 11a and the second microlens array unit 11b are arranged opposite to each other so that the surfaces formed with the plurality of microlenses 11aa, 11ba confront each other. Namely, the first microlens array unit 11a and the second microlens array unit 11b have the plurality of microlenses 11aa, 11ba on the opposite surfaces. Also, the first microlens array unit 11a and the second microlens array unit 11b are arranged opposite to each other with a distance D therebetween. In this embodiment, the first microlens array unit 11a and the second microlens array unit 11b are arranged opposite to each other with the distance D which is at least longer than the focal length of the microlenses 11aa arranged in the first microlens array unit 11a. For example, the first microlens array unit 11a and the second microlens array unit 11b are arranged at the position apart from each other by the distance D which is equal to or larger than 1.5 times and equal to or smaller than 3 times of the focal distance of the microlenses 11aa.

FIG. 3B shows the plan view of the first microlens array unit 11a and the second microlens array unit 11b. Specifically, FIG. 3B shows the plan view of a magnified part of the first microlens array unit 11a and the second microlens array unit 11b observed in a direction along the advancing direction of the light. As shown in FIG. 3B, on the first microlens array unit 11a and the second microlens array unit 11b, a plurality of microlenses 11aa, 11ba formed in the lens contour of the regular hexagon shape in a plan view are arranged in a lattice manner, respectively. Specifically, the plurality of microlenses 11aa, 11ba are arranged such that the sides forming the regular hexagon shape are adjacent to each other.

In this embodiment, as shown in FIG. 3B, the first microlens array unit 11a and the second microlens array unit 11b are formed such that the lens pitch Pa of the microlenses 11aa arranged in the first microlens array unit 11a is different from the lens pitch Pb of the microlenses 11ba arranged in the second microlens array unit 11b. Specifically, the first microlens array unit 11a and the second microlens array unit 11b are formed such that the lens pitch Pb in the second microlens array unit 11b is smaller than the lens pitch Pa in the first microlens array unit 11a, i.e., the lens diameter of one microlens 11ba is smaller than the lens diameter of one microlens 11aa. For example, the first microlens array unit 11a and the second microlens array unit 11b are formed such that the lens pitch Pb of the microlens 11ba is equal to or smaller than "½" of the lens pitch Pa of the microlens 11aa.

In other words, the above-described lens pitch Pa, Pb is the interval between the neighboring microlenses 11aa, 11ba arranged in the first microlens array unit 11a and the second microlens array unit 11b, and corresponds to the interval between the center of gravity of the neighboring microlenses 11aa, 11ba (i.e., the distance between the centers). This is also applied to the following description.

[Operation/Effect of Screen]

Next, the operation and effect of the screen 11 according to the above embodiment will be described.

Figure 4A:
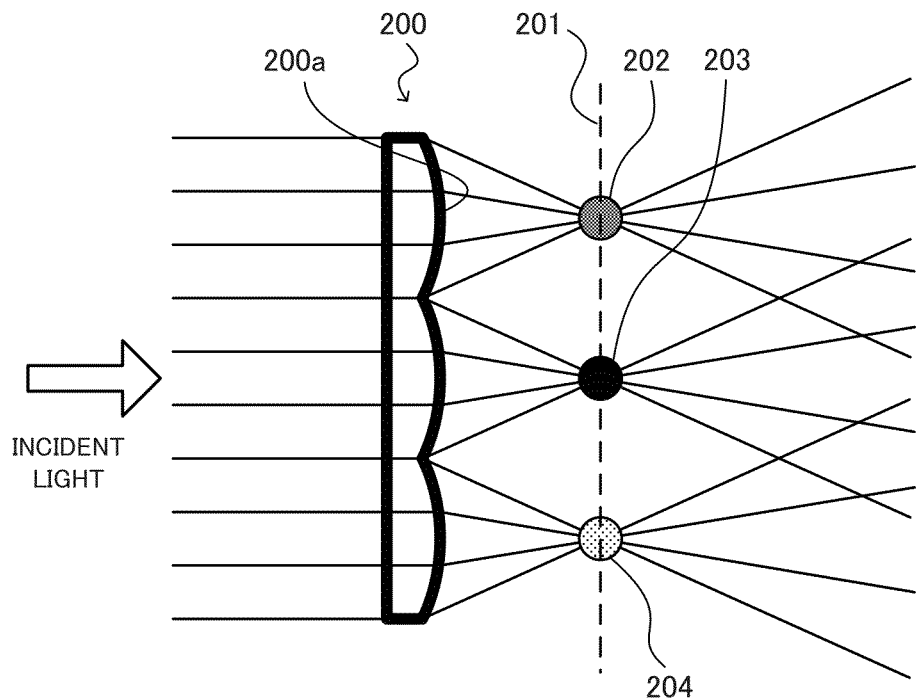
FIGS. 4A and 4B show diagrams for explaining excessive pixel bright spots caused by a general microlens array unit.

First, with reference to FIGS. 4A and 4B, the description will be given of the excessive pixel bright spots caused by a general microlens array unit 200. FIG. 4A is a diagram for explaining an intermediate image formed by a general microlens array unit 200. For example, when the microlens array unit 200 is applied to a laser scan type light source, the intermediate image whose pixel positions coincide with the focal points of the microlenses 200a of the microlens array unit 200 is formed on the plane (it is a focal plane and hereinafter referred to as "intermediate image plane") indicated by the reference numeral 201. In the example shown in FIG. 4A, the intermediate image is formed by the pixels 202, 203, 204 formed at the focal points of the microlenses 200a. The interval of such pixels 202, 203, 204 is equal to the lens pitch Pa of the microlens array unit 200.

Figure 4B:
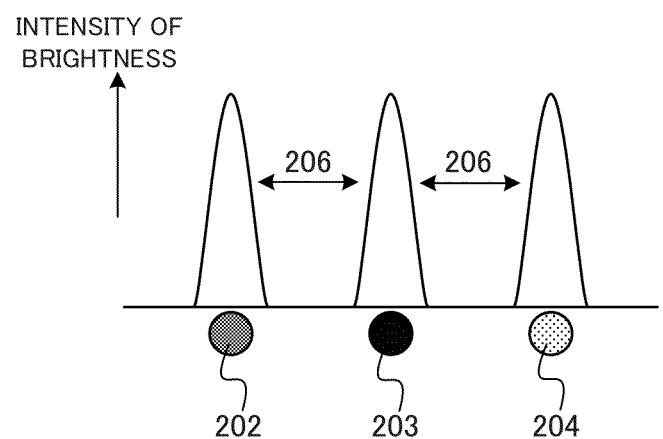

FIG. 4B shows the intensity distribution of the brightness on the intermediate image plane. Specifically, FIG. 4B shows the intensity distribution (it generally becomes a gaussian distribution) of the brightness corresponding to the pixels 202, 203, 204 formed on the intermediate image plane 201. As described above, when the microlens array unit 200 is applied to the laser scan type light source, the focusing characteristic is high at the focal points of the microlenses 200a because the light source is the laser. Therefore, as shown by the arrows 206 in FIG. 4B, the pixels 202, 203, 204 tend to be separated on the intermediate image plane 201. Namely, on the intermediate image plane 201, bright portions and dark portions of the brightness clearly appear. Accordingly, if the intermediate image is magnified and displayed by a head-up display, for example, the pixels 202, 203, 204 formed by the microlenses 200a of the microlens array unit 200 possibly become conspicuous as the excessive pixel bright spots. Such a phenomenon may similarly occur in a case of using two microlens array units 200 (the microlens array units 200 whose lens pitch is nearly equal).

Figure 5A:
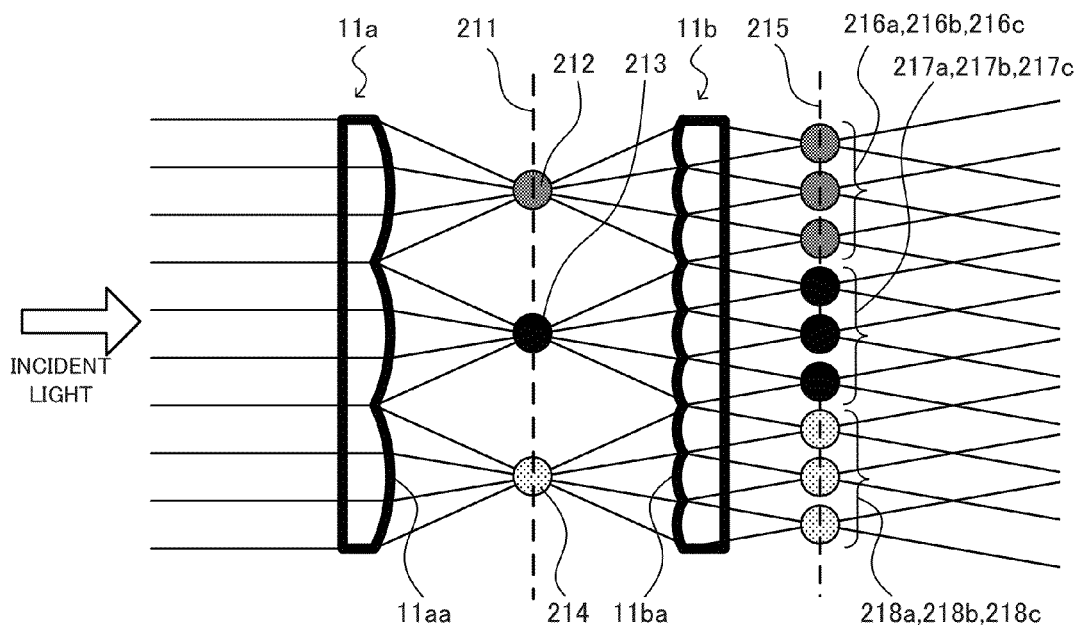
FIGS. 5A and 5B show diagrams for explaining operation and effect of the screen according to the embodiment.

Next, with reference to FIGS. 5A and 5B, the operation and effect of the screen 11 according to this embodiment will be described. FIG. 5A shows a diagram for explaining the intermediate image formed by the first microlens array unit 11a and the second microlens array unit 11b. In this embodiment, since the lens pitch Pb of the second microlens array unit 11b is smaller than the lens pitch Pa of the first microlens array unit 11a, the light focused by one microlens 11aa of the first microlens array unit 11a is incident upon two or more microlenses 11ba of the second microlens array unit 11b. In the example shown in FIG. 5A, since the lens pitch Pb of the microlenses 11ba is "⅓" of the lens pitch Pa of the microlenses 11aa, the light focused by one microlens 11aa is incident upon three microlenses 11ba. Thus, one pixel formed by one microlens 11aa of the first microlens array unit 11a is divided by three microlenses 11ba of the second microlens array unit 11b, and three pixels are formed (hereinafter, the pixel divided by the second microlens array unit 11b will be referred to as "divided pixel").

FIG. 5A shows an example, wherein the pixels 212, 213, 214 are formed as the intermediate images on the intermediate image plane 211 positioned at the focal point of the microlenses 11aa of the first microlens array unit 11a, and the divided pixels 216a to 216c, 217a to 217c, 218a to 218c are formed as the intermediate images on the intermediate image plane 215 positioned at the focal point of the microlenses 11ba of the second microlens array unit 11b. The divided pixels 216a to 216c are three pixels formed by dividing the pixel 212 formed by the microlens 11aa, the divided pixels 217a to 217c are three pixels formed by dividing the pixel 213 formed by the microlens 11aa, and the divided pixels 218a to 218c are three pixels formed by dividing the pixel 214 formed by the microlens 11aa.

Figure 5B:
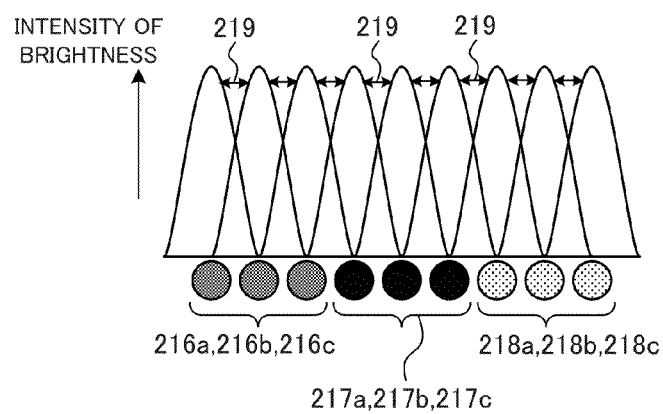

FIG. 5B shows an intensity distribution of the brightness at the intermediate image plane 215. Specifically, FIG. 5B shows the intensity distribution (it generally becomes a gaussian distribution) of the brightness corresponding to the divided pixels 216a to 216c, 217a to 217c, 218a to 218c formed on the intermediate image plane 215. Here, since the divided pixels 216a to 216c, 217a to 217c, 218a to 218c correspond to the pixels 212, 213, 214, respectively, the intervals between the groups of the divided pixels 216a to 216c, 217a to 217c, 218a to 218c are equal to the lens pitch of the first microlens array unit 11a. However, each of the intervals between the divided pixels 216a to 216c, 217a to 217c, 218a to 218c are equal to the lens pitch of the second microlens array unit 11b, which is smaller than the lens pitch of the first microlens array unit 11a. On the other hand, by focusing the light focused by the first microlens array unit 11a by the second microlens array unit 11b, the focusing characteristic by each pixel is expanded. Namely, the intensity distribution in the brightness of the divided pixels formed by the second microlens array unit 11b tends to expand on a space.

For this reason, as shown by the arrows 219 in FIG. 5B, the separation of the divided pixels 216a to 216c, 217a to 217c, 218a to 218c becomes inconspicuous on the intermediate image plane 215. Namely, in comparison with the case where the above-described general microlens array unit 200 is used (see the arrows 206 in FIG. 4B), the separation of the pixels can be inconspicuous, i.e., the pixel bright spots can be inconspicuous in this embodiment. Therefore, according to this embodiment, when the intermediate image is magnified and displayed by a head-up display, occurrence of the above-described excessive pixel bright spots can be appropriately suppressed.

Also, in this embodiment, the first microlens array unit 11a and the second microlens array unit 11b are arranged opposite to each other at the positions apart from each other by the distance D, which is at least longer than the focal length of the microlenses 11aa of the first microlens array unit 11a. Thus, the light incident upon one microlens 11aa of the first microlens array unit 11a can be incident upon plural microlenses 11ba of the second microlens array unit 11b. Then, the light can be focused by the respective microlenses 11ba of the second microlens array unit 11b to form the pixels. Thereby, the light can be appropriately dispersed to form a uniform and even image (with less unevenness of brightness).

By the way, the above-mentioned Non-Patent Reference 1 discloses forming a screen (hereinafter referred to as "screen of comparative example") by using two microlens arrays. In the screen of comparative example, basically two microlens arrays are positioned apart from each other with an interval equal to the focal length of the microlenses. In the configuration of the screen of comparative example, the positions of the two microlens arrays must be strictly adjusted. Specifically, the optical axes of the respective microlenses of the two microlens arrays must be coincide. This is because, if the distance between the two microlens arrays are not equal to the focal length or if the vertex direction of the lens contour of the microlenses are deviated, there may occur such a disadvantage that the microlenses introduce unnecessary light or the adverse effect of the deviation becomes conspicuous. Therefore, in the comparative example, producing the screen tends to require labor and cost.

In contrast, in this embodiment, the first microlens array unit 11a and the second microlens array unit 11b are arranged opposite to each other with a distance D which is at least longer than the focal length of the microlenses 11aa of the first microlens array unit 11a. According to this embodiment, in comparison with the configuration of the comparative example in which two microlens arrays are strictly positioned with an interval equal to the focal length of the microlenses, the resolution tends to be low, but the accuracy required to arrange the first microlens array unit 11a and the second microlens array unit 11b in an opposite manner may be lowered.

Further, according to this embodiment, by the above-described configuration, since it is not necessary to coincide the optical axes of the lenses, if the incident angle changes, the influence thereof can be diminished. Accordingly, this embodiment can appropriately cope with a laser scan type light source having a relatively large angle of view. Therefore, it is not necessary to use a condenser lens arranged between the laser projector and the microlens array as described in Patent Reference 1. As a result, according to this embodiment, number of parts used in the image display apparatus 1 can be reduced.

While FIGS. 5A and 5B show an example in which the lens pitch Pb of the microlenses 11ba in the second microlens array unit 11b is "⅓" of the lens pitch Pa of the microlenses 11aa in the first microlens array unit 11a, the present invention is not limited to this example. For example, the lens pitch Pb in the second microlens array unit 11b may be "½", "¼" or "⅕" of the lens pitch Pa in the first microlens array unit 11a. In this case, one pixel formed by the first microlens array unit 11a is divided into two, four or more than four pixels by the second microlens array unit 11b. Basically, the smaller the lens pitch Pb of the second microlens array unit 11b than the lens pitch Pa of the first microlens array unit 11a, the more the influence by the positional deviation between the first microlens array unit 11a and the second microlens array unit 11b can be suppressed.

Up to here, the examples are described in which the lens pitch Pb of the second microlens array unit 11b is "1/n" of the lens pitch Pa of the first microlens array unit 11a, wherein "n" is an integer. In this case, one pixel formed by the first microlens array unit 11a is divided into "n" pixels by the second microlens array unit 11b.

Hereinafter, a case of using a value "n", which is not an integer, will be considered. For example, the lens pitch Pb in the second microlens array unit 11b is "⅖", "2/7" or "3/7" of the lens pitch Pa in the first microlens array unit 11a. In such cases, the light focused by two neighboring microlenses 11aa in the first microlens array unit 11a tends to be incident upon the same one microlens 11*ba* in the second microlens array unit 11*b*. Namely, the light focused by two neighboring microlenses 11*aa* tends to be mixed in one microlens 11*ba*. (It is noted that this phenomenon does not necessarily occur in all microlenses 11*ba* in the second microlens array unit 11*b*.) In this case, the light is influenced by the pixel formed by the microlens 11*aa* neighboring in the first microlens array unit 11*a*. However, by setting "n" to be large value, i.e., by making the lens pitch Pb of the second microlens array unit 11*b* smaller than the lens pitch Pa of the first microlens array unit 11*a*, such influence can be diminished. Also, it is possible to suppress the influence by the positional deviation between the first microlens array unit 11*a* and the second microlens array unit 11*b*.

It is noted that, even when an integer value is used as "n", the lights focused by two microlenses 11*aa* may be slightly mixed in one microlens 11*ba*.

MODIFIED EXAMPLES

In the following, modified examples of the above-described embodiment will be described. It is noted that the description of the same configuration as that of the above-described embodiment will be suitably omitted. Also, it is noted that the configuration not particularly mentioned is the same as that of the above embodiment.

1st Modified Example

In the screen 11 according to the above-described embodiment, the first microlens array unit 11*a* and the second microlens array unit 11*b* are formed with the plural microlenses 11*aa*, 11*ba* on the opposite surfaces thereof. In contrast, in the screen according to the first modified example, one of the first and the second microlens array units 11*a*, 11*b* is formed with the plural microlenses on the opposite surface, and the other of the first and the second microlens array units 11*a*, 11*b* is formed with the plural microlenses on the back surface of the opposite surface. In other words, in the screen according to the first modified example, the plurality of microlenses are formed on the surfaces of the first microlens array unit 10*a* and the second microlens array unit 10*b* directed to the same direction (specifically, the surface directed to the light-incident side or the surface directed to the light-exiting side).

Figure 6:
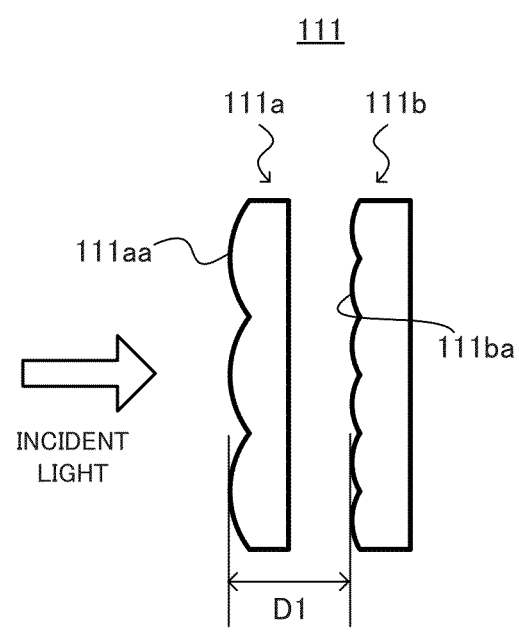
FIG. 6 shows a specific configuration of a screen according to a first modified example.

FIG. 6 shows a specific configuration of the screen 111 according to the first modified example. FIG. 6 is a sectional view of the first microlens array unit 111*a* and the second microlens array unit 111*b* of the screen 111 cut along a plane perpendicular to the advancing direction of the light. Specifically, FIG. 6 shows the sectional view of a magnified part of the first microlens array unit 111*a* and the second microlens array unit 111*b*. It is noted that the light is incident on the side of the first microlens array unit 111*a*.

As shown in FIG. 6, the first microlens array unit 111*a* is formed with plural microlenses 111*aa* on the back surface of the surface of the first microlens array unit 111*a* opposite to the second microlens array unit 111*b*. The second microlens array unit 111*b* is formed with plural microlenses 111*ba* on the surface of the second microlens array unit 111*b* opposite to the first microlens array unit 111*a*. Namely, the first microlens array unit 111*a* and the second microlens array unit 111*b* are arranged opposite to each other such that the surface of the first microlens array unit 111*a* without microlenses 111*aa* faces the surface of the second microlens array unit 111*b* formed with microlenses 111*ba*.

Also, the first microlens array unit 111*a* and the second microlens array unit 111*b* are arranged at the positions apart from each other by the distance D1 which is at least longer than the focal length of the microlenses 111*aa* of the first microlens array unit 111*a*. The first microlens array unit 111*a* and the second microlens array unit 111*b* are formed such that the lens pitch of the microlenses 111*ba* in the second microlens array unit 111*b* is smaller than the lens pitch of the microlenses 111*aa* in the first microlens array unit 111*a* (e.g., equal to or smaller than "½").

In the screen 111 shown in FIG. 6, the first microlens array unit 111*a* and the second microlens array unit 111*b* are formed with the plural microlenses 111*aa*, 111*ba* on the surfaces of the light-incident side. In another example, the plural microlenses may be formed on the surfaces of the first and the second microlens array units directed to the light-exiting side.

Figure 7:
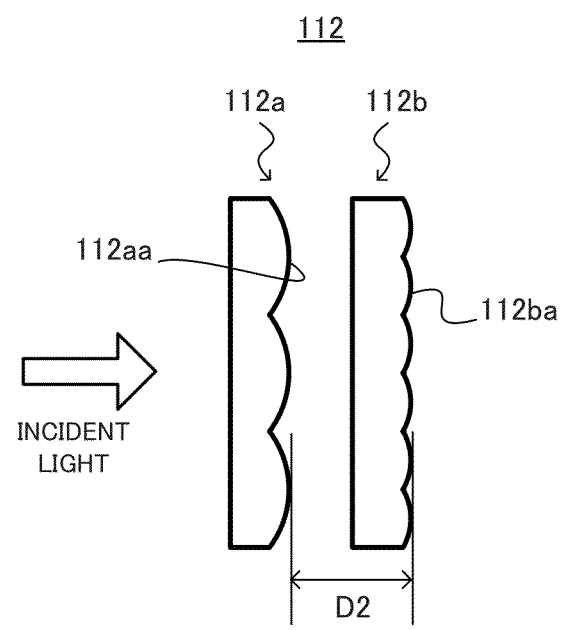
FIG. 7 shows a specific configuration of a screen according to another example of the first modified example.

FIG. 7 shows a specific configuration of the screen 112 according to another example of the first modified example. FIG. 7 is a sectional view of the first microlens array unit 112*a* and the second microlens array unit 112*b* of the screen 112 cut along a plane perpendicular to the advancing direction of the light. Specifically, FIG. 7 shows the sectional view of a magnified part of the first microlens array unit 112*a* and the second microlens array unit 112*b*. It is noted that the light is incident on the side of the first microlens array unit 112*a*.

As shown in FIG. 7, the first microlens array unit 112*a* is formed with plural microlenses 112*aa* on the surface opposite to the second microlens array unit 112*b*. The second microlens array unit 112*b* is formed with plural microlenses 112*ba* on the back surface of the surface opposite to the first microlens array unit 112*a*. Namely, the first microlens array unit 112*a* and the second microlens array unit 112*b* are arranged opposite to each other such that the surface of the first microlens array unit 112*a* formed with the microlenses 112*aa* faces the surface of the second microlens array unit 112*b* without microlens 112*ba*.

Also, the first microlens array unit 112*a* and the second microlens array unit 112*b* are arranged at the positions apart from each other by the distance D2 which is at least longer than the focal length of the microlenses 112*aa* of the first microlens array unit 112*a*. The first microlens array unit 112*a* and the second microlens array unit 112*b* are formed such that the lens pitch of the microlenses 112*ba* in the second microlens array unit 112*b* is smaller than the lens pitch of the microlenses 112*aa* in the first microlens array unit 112*a* (e.g., equal to or smaller than "½").

The above-described screens 111, 112 according to the first modified example have the same operation and effect as the screen 11 according to the above-described embodiment.

2nd Modified Example

The screen according to the second modified example is different from the embodiment and the first modified example described above in that plural microlenses are formed on the respective back surfaces of the opposite surfaces of the first and the second microlens array units.

Figure 8:
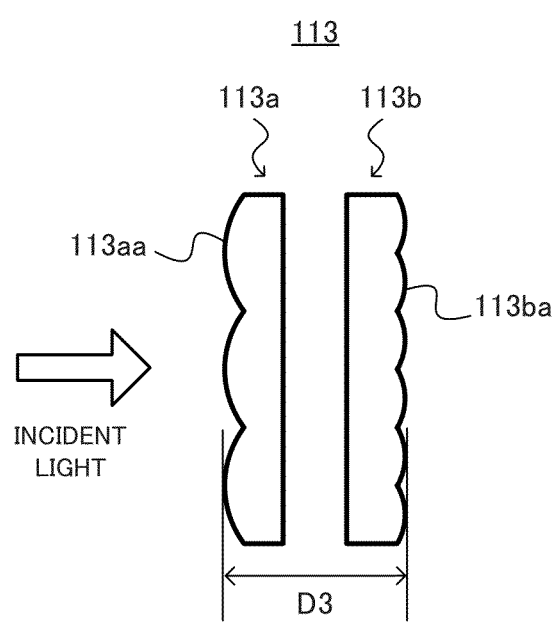
FIG. 8 shows a specific configuration of a screen according to a second modified example.

FIG. 8 shows a specific configuration of the screen 113 according to the second modified example. FIG. 8 is a sectional view of the first microlens array unit 113*a* and the second microlens array unit 113*b* of the screen 113 cut along a plane perpendicular to the advancing direction of the light. Specifically, FIG. 8 shows the sectional view of a magnified part of the first microlens array unit 113*a* and the second microlens array unit 113*b*. It is noted that the light is incident on the side of the first microlens array unit 113*a*.

As shown in FIG. 8, the first microlens array unit 113*a* and the second microlens array unit 113*b* are formed with plural microlenses 113*aa*, 113*ba* on the back surfaces of the surfaces opposite to each other. Namely, the first microlens array unit 113*a* and the second microlens array unit 113*b* are arranged opposite to each other such that the surfaces formed with the plural microlenses 113*aa*, 113*ba* are directed to the opposite directions.

Also, the first microlens array unit 113*a* and the second microlens array unit 113*b* are arranged at the positions apart from each other by the distance D3 which is at least longer than the focal length of the microlenses 113*aa* of the first microlens array unit 113*a*. The first microlens array unit 113*a* and the second microlens array unit 113*b* are formed such that the lens pitch of the microlenses 113*ba* in the second microlens array unit 113*b* is smaller than the lens pitch of the microlenses 113*aa* in the first microlens array unit 113*a* (e.g., equal to or smaller than "½").

The above-described screen 113 according to the second modified example has the same operation and effect as the screen 11 according to the above-described embodiment.

3rd Modified Example

In the third modified example, the first and the second microlens array units are not formed as separate parts like the above embodiment and the first and second modified examples. Namely, the first and the second microlens array units are formed as a single part, and plural microlenses are formed on both sides of the screen.

Figure 9:
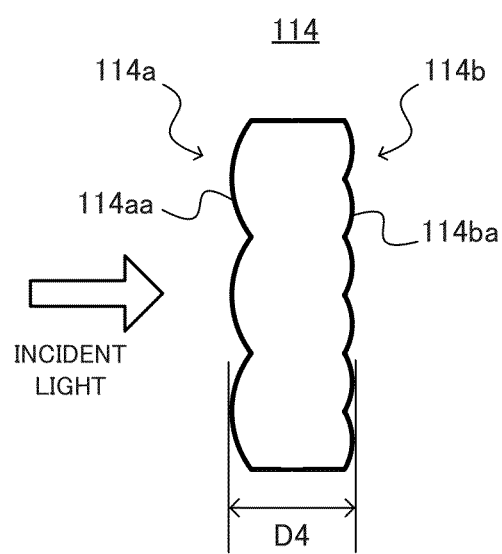
FIG. 9 shows a specific configuration of a screen according to a third modified example.

FIG. 9 shows a specific configuration of the screen 114 according to the third modified example. FIG. 9 shows a sectional view of the screen 114 cut along the plane perpendicular to the advancing direction of the light. Specifically, FIG. 9 shows a sectional view of a magnified part of the screen 114. It is noted that the light is incident on the side of the first microlens array unit 114*a*.

As shown in FIG. 9, the screen 114 is formed with plural microlenses 114*aa*, 114*ba* on two opposite sides (i.e., on both sides) forming the screen 114. In other words, as the screen 114, the first microlens array unit 114*a* formed with plural microlenses 114*aa* and the second microlens array unit 114*b* formed with plural microlenses 114*ba* are integrated as a single unit. Namely, the screen 114 is formed as an integrated unit by attaching the back surface of the surface of the first microlens array unit 114*a* formed with the plural microlenses 114*aa* and the back surface of the surface of the second microlens array unit 114*b* formed with the plural microlenses 114*ba*.

Also, in the screen 114, the plural microlenses 114*aa* and the plural microlenses 114*ba* are arranged at the positions apart from each other by the distance D4 which is at least longer than the focal length of the microlenses 114*aa* of the first microlens array unit 114*a*. Namely, the screen 114 has a thickness corresponding to the distance D4 which is at least longer than the focal length of the microlenses 114*aa*. The first microlens array unit 114*a* and the second microlens array unit 114*b* are formed such that the lens pitch of the microlenses 114*ba* in the second microlens array unit 114*b* is smaller than the lens pitch of the microlenses 114*aa* in the first microlens array unit 114*a* (e.g., equal to or smaller than "½").

The above-described screen 114 according to the third modified example has the same operation and effect as the screen 11 according to the above-described embodiment. In addition, since the first microlens array unit 114*a* and the second microlens array unit 114*b* are integrated as a single unit in the third modified example, it is only necessary to make one constitutional element formed with the microlens arrays. Therefore, the cost necessary for the screen 114 can be further diminished in comparison with the embodiment and the first and second modified examples described above.

4th Modified Example

The screen according to the fourth modified example is different from the embodiment and the first to third modified examples described above in that the vertex directions of the lens contour of the microlenses arranged on one of the first and second microlens array units is shifted from the vertex directions of the lens contour of the microlenses arranged on the other one of the first and second microlens array units.

Figure 10A:
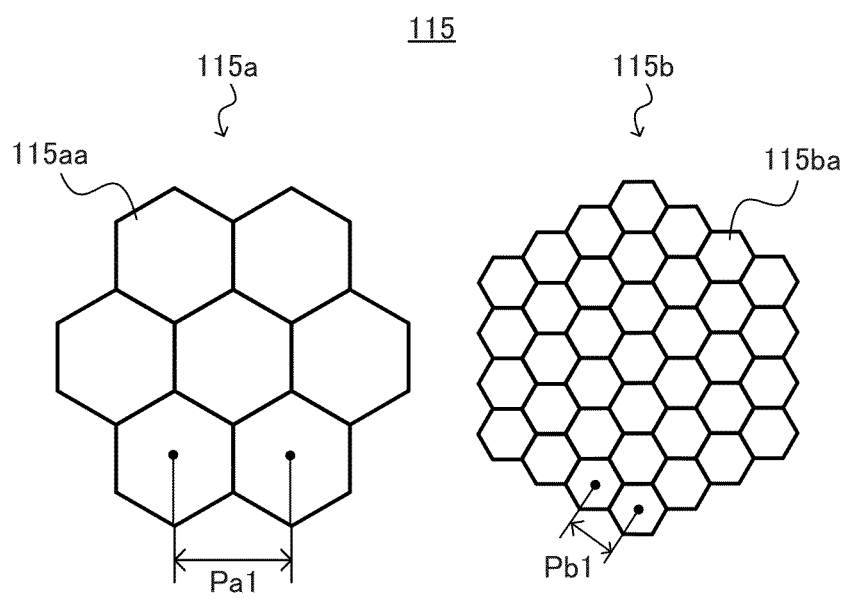
FIG. 10 shows a specific configuration of a screen according to a fourth modified example.
Figure 10B:
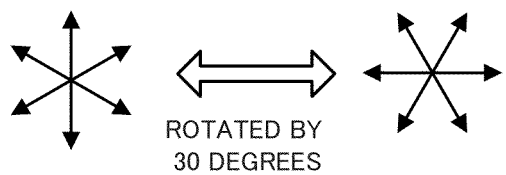

FIGS. 10A and 10B show a specific configuration of the screen 115 according to the fourth modified example. FIG. 10A is a plan view of a magnified part of the first microlens array unit 115*a* and the second microlens array unit 115*b* of the screen 115 observed along the advancing direction of the light. It is noted that the light is incident on the side of the first microlens array unit 115*a*.

FIG. 10B prescribes the vertex directions of the regular hexagon shapes which are the lens contour of the first microlens array unit 115*a* and the second microlens array unit 115*b*. The vertex directions are prescribed by the directions from the center (center of gravity) of the regular hexagon, which is the lens contour, to each of the vertexes of the regular hexagon. The left side of FIG. 10B shows the vertex directions of the regular hexagon which is the lens contour of the microlens 115*aa*, and the right side of FIG. 10B shows the vertex directions of the regular hexagon which is the lens contour of the microlens 115*ba*. In the first microlens array unit 115*a* and the second microlens array unit 115*b*, plural microlenses 115*aa*, 115*ba* are arranged in a lattice pattern. Namely, each of the plural microlenses 115*aa*, 115*ba* is arranged in the same direction. Therefore, the vertex directions of the regular hexagon becomes the same in the whole part in the first microlens array unit 115*a* and the second microlens array unit 115*b*.

As shown in FIGS. 10A and 10B, in the fourth modified example, the angle difference between the vertex directions of the regular hexagon which is the lens contour of the microlenses 115*aa* arranged in the first microlens array unit 115*a* and the vertex directions of the regular hexagon which is the lens contour of the microlenses 115*ba* arranged in the second microlens array unit 115*b* is set to 30 degrees. Namely, the plural microlenses 115*aa*, 115*ba* are arranged in the first microlens array unit 115*a* and the second microlens array unit 115*b* such that the regular hexagons of the lens contours of the microlenses 115*aa*, 115*ba* have the relation of being rotated by 30 degrees.

By configuring the first microlens array unit 115*a* and the second microlens array unit 115*b* such that the regular hexagons which are the lens contours of the microlenses 115*aa*, 115*ba* have the relation of being rotated by 30 degrees in this way, it is possible to suppress unnecessary interference between the image of the regular hexagon shape by the first microlens array unit 115*a* at the light-incident plane of the second microlens array unit 115*b* and the regular hexagon shape which is the lens contour of the second microlens array unit 115*b*. Namely, in the fourth modified example, since the vertex directions of the lens contour of the first microlens array unit 115*a* and the vertex directions of the lens contour of the second microlens array unit 115*b* are shifted from each other, the image of the regular hexagon shape at the light-incident plane of the second microlens array unit 115*b* can be fuzzy. Thereby, it is possible to appropriately suppress the influence by the positional deviation of the first microlens array unit 115a and the second microlens array unit 115b.

Also, according to the fourth modified example, since the vertex directions of the lens contour in the first microlens array unit 115a and the second microlens array unit 115b are shifted, it is not necessary to strictly coincide the vertex directions of the lens contours in the first microlens array unit 115a and the second microlens array unit 115b and to strictly set the angle difference between the vertex directions of the lens contours to a predetermined degree. According to the fourth modified example described above, in comparison with the configuration of the comparative example (configuration disclosed in Non-Patent Reference 1) in which two microlens arrays are arranged such that the vertex directions of the lens contours of the microlenses need to be strictly coincident, it is possible to lower the accuracy required to arrange the vertex directions of the lens contours in the first microlens array unit 115a and the second microlens array unit 115b. From this, according to the fourth modified example, in comparison with the comparative example, the screen 11 can be easily produced with low cost.

The unnecessary interference by the images of the regular hexagon shape as described above can be suppressed even if the angle difference of the vertex directions of the regular hexagon shape, which are the lens contours of the first microlens array unit 115a and the second microlens array unit 115b, is not 30 degrees. Namely, while the angle difference of the vertex directions of the regular hexagon shape, which are the lens contours of the first microlens array unit 115a and the second microlens array unit 115b, is set to 30 degrees in the above example, the angle difference is not necessarily strictly 30 degrees and may be different angle than 30 degrees. This is because, if the vertex directions of the regular hexagon shapes, which are the lens contours of the first microlens array unit 115a and the second microlens array unit 115b, are shifted to some extent (i.e., if the vertex directions of the regular hexagon shapes are not coincident), the second microlens array unit 115b can make the image of the regular hexagon shape at the light-incident plane fuzzy to some extent. According to experiments, it is known that the effect of suppressing the unnecessary interference by the images of the regular hexagon shape is large when the angle difference of the vertex directions of the regular hexagon shapes which are the lens contours is nearly 30 degrees or nearly 90 degrees. Therefore, it is desired that the angle difference of the vertex directions of the regular hexagon shapes, which are the lens contours of the first microlens array unit 115a and the second microlens array unit 115b, is nearly 30 degrees or nearly 90 degrees.

As shown in FIG. 10A, the first microlens array unit 115a and the second microlens array unit 115b according to the fourth modified example are configured such that the lens pitch Pb1 of the microlenses 115ba in the second microlens array unit 115b is smaller than the lens pitch Pa1 of the microlenses 115aa in the first microlens array unit 115a (e.g., equal to or smaller than "½"). Further, the first microlens array unit 115a and the second microlens array unit 115b are arranged opposite to each other with the distance at least longer than the focal length of the microlens 115aa of the first microlens array unit 115a. Therefore, the screen 115 according to the fourth modified example has the same operation and effect as the screen 11 according to the embodiment described above.

To the first microlens array unit 115a and the second microlens array unit 115b according to the fourth modified example, the arrangement relation indicated by one of the embodiment and the first and second modified examples described above (see FIG. 3A, FIG. 6, FIG. 7, FIG. 8) is applied. Or, the first microlens array unit 115a and the second microlens array unit 115b are integrated as a single unit as shown by the third modified example (see FIG. 9).

5th Modified Example

The screen according to the embodiment and the first to fourth modified examples described above are formed by the first and second microlens array units having the microlenses whose lens contour is the regular hexagon shape, i.e., the lengths of all sides are the same. In contrast, the screen according to the fifth modified example is formed by the first and second microlens array units whose lens contour is not a regular hexagon shape but is nearly a regular hexagon shape (i.e., a hexagon shape in which all sides are not the same length).

Figure 11:
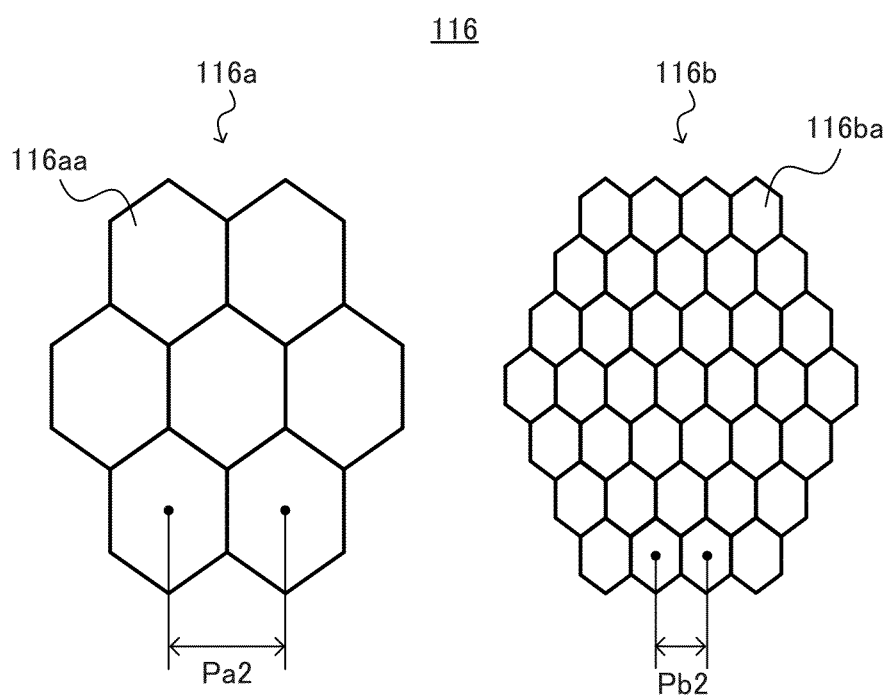
FIG. 11 shows a specific configuration of a screen according to a fifth modified example.

FIG. 11 shows a specific configuration of the screen 116 according to the fifth modified example. Specifically, FIG. 11 is a plan view of a magnified part of the first microlens array unit 116a and the second microlens array unit 116b of the screen 116, observed in the direction along the advancing direction of the light. It is noted that the light is incident on the side of the first microlens array unit 116a.

As shown in FIG. 11, the first microlens array unit 116a and the second microlens array unit 116b are formed by plural microlenses 116aa, 116ba each having a lens contour of the hexagon shape in a plan view, respectively. Specifically, the microlenses 116aa, 116ba is formed in a lens contour, not a regular hexagon shape (i.e., the lengths of all sides are not the same), but an axially symmetrical shape.

Also, the first microlens array unit 116a and the second microlens array unit 116b are configured such that the lens pitch Pb2 of the microlenses 116ba of the second microlens array unit 116b is smaller than the lens pitch Pa2 of the microlenses 116aa of the first microlens array unit 116a (e.g., equal to or smaller than "½"). Further, the first microlens array unit 116a and the second microlens array unit 116b are arranged opposite to each other with a distance which is at least longer than the focal length of the microlens 116aa of the first microlens array unit 116a. In this case, to the first microlens array unit 116a and the second microlens array unit 116b, the arrangement relation indicated by one of the embodiment and the first and second modified examples described above (see FIG. 3A, FIG. 6, FIG. 7, FIG. 8) is applied. Or, the first microlens array unit 116a and the second microlens array unit 116b are integrated as a single unit as shown by the third modified example (see FIG. 9).

The screen 116 according to the fifth modified example has the same operation and effect as the screen 11 according to the embodiment described above.

The configuration shown in the fourth modified example described above may be applied to the screen according to the fifth modified example. Namely, the first and second microlens array units formed by the lens contour of the nearly regular hexagon shape as shown in FIG. 11 may be arranged such that the vertex directions of the lens contour of the microlenses arranged in one of the microlens array units is shifted by a certain angle from the vertex directions of the lens contour of the microlenses arranged in the other of the microlens array units.

Figure 12:
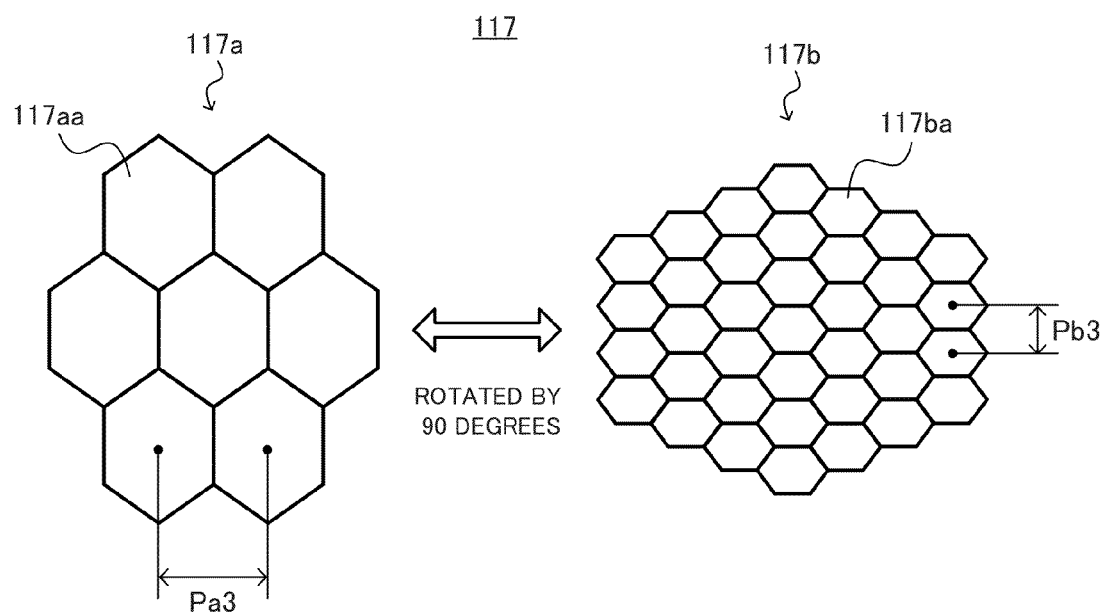
FIG. 12 shows a specific configuration of a screen according to another example of the fifth modified example.

FIG. 12 shows a specific configuration of the screen 117 according to another example of the fifth modified example. Specifically, FIG. 12 is a plan view of a magnified part of the first microlens array unit 117a and the second microlens array unit 117b of the screen 117, observed in the direction along the advancing direction of the light. It is noted that the light is incident on the side of the first microlens array unit 117a.

As shown in FIG. 12, there is an angle difference of 90 degrees between the vertex directions of the hexagon shape which is the lens contour of the microlens 117aa arranged in the first microlens array unit 117a and the vertex directions of the hexagon shape which is the lens contour of the microlens 117ba arranged in the second microlens array unit 117b. Namely, the plural microlenses 117aa, 117ba are arranged in the first microlens array unit 117a and the second microlens array unit 117b such that the hexagon shapes which are the lens contours of the microlenses 117aa, 117ba has the relation of being rotated by 90 degrees relative to each other.

Also, the first microlens array unit 117a and the second microlens array unit 117b are configured such that the lens pitch Pb3 of the microlenses 117ba of the second microlens array unit 117b is smaller than the lens pitch Pa3 of the microlenses 117aa of the first microlens array unit 117a (e.g., equal to or smaller than "½"). Further, the first microlens array unit 117a and the second microlens array unit 117b are arranged opposite to each other with a distance which is at least longer than the focal length of the microlens 117aa of the first microlens array unit 117a. In this case, to the first microlens array unit 117a and the second microlens array unit 117b, the arrangement relation indicated by one of the embodiment and the first and second modified examples described above (see FIG. 3A, FIG. 6, FIG. 7, FIG. 8) is applied. Or, the first microlens array unit 117a and the second microlens array unit 117b are integrated as a single unit as shown by the third modified example (see FIG. 9).

The screen 117 according to another example of the fifth modified example has the same operation and effect as the screen 11 according to the embodiment and the screen 115 according to the fourth modified example described above.

The hexagon shapes shown in FIGS. 11 and 12 are merely an example, and the present invention is not limited to forming the lens contour of the microlens into those hexagon shapes. Also, the present invention is not limited to such an arrangement that the angle difference of the vertex directions of the hexagon shapes being the lens contours is 90 degrees, as shown in FIG. 12.

Sixth Modified Example

The screens according to the embodiment and the first to fifth modified examples described above are configured by the first and second microlens array units having the microlenses whose lens contour is a hexagon shape (a regular hexagon shape or a nearly regular hexagon shape). In contrast, the screen according to the sixth modified example is configured by the first and second microlens array units having the microlenses whose lens contour is a square shape.

Figure 13:
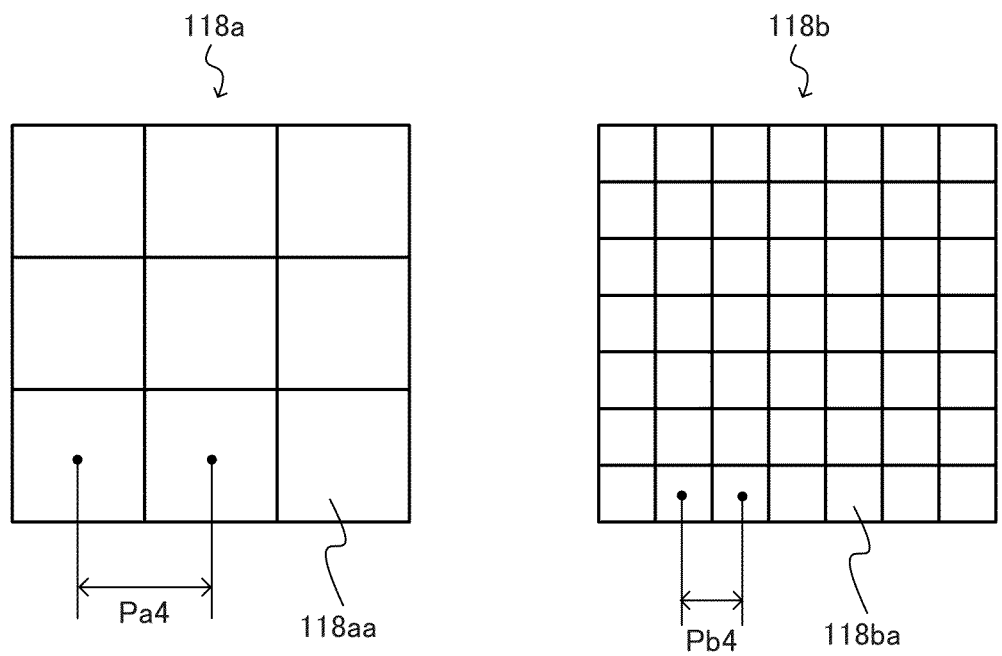
FIG. 13 shows a specific configuration of a screen according to a sixth modified example.

FIG. 13 shows a specific configuration of the screen 118 according to the sixth modified example. Specifically, FIG. 13 is a plan view of a magnified part of the first microlens array unit 118a and the second microlens array unit 118b of the screen 118, observed in the direction along the advancing direction of the light. It is noted that the light is incident on the side of the first microlens array unit 118a.

As shown in FIG. 13, the first microlens array unit 118a and the second microlens array unit 118b are formed by the plural microlenses 118aa, 118ba arranged in a lattice pattern, respectively, each of the microlenses 118aa, 118ba having a lens contour of a square shape in a plan view. Also, the first microlens array unit 118a and the second microlens array unit 118b are configured such that the lens pitch Pb4 of the microlenses 118ba of the second microlens array unit 118b is smaller than the lens pitch Pa4 of the microlenses 118aa of the first microlens array unit 118a (e.g., equal to or smaller than "½"). Further, the first microlens array unit 118a and the second microlens array unit 118b are arranged opposite to each other with a distance which is at least longer than the focal length of the microlens 118aa of the first microlens array unit 118a. In this case, to the first microlens array unit 118a and the second microlens array unit 118b, the arrangement relation indicated by one of the embodiment and the first and second modified examples described above (see FIG. 3A, FIG. 6, FIG. 7, FIG. 8) is applied. Or, the first microlens array unit 118a and the second microlens array unit 118b are integrated as a single unit as shown by the third modified example (see FIG. 9).

The screen 118 according to the sixth modified example has the same operation and effect as the screen 11 according to the embodiment described above.

The configuration shown in the fourth modified example described above may be applied to the screen according to the sixth modified example. Namely, the first and second microlens array units formed by the lens contour of the square shape as shown in FIG. 13 may be arranged such that the vertex directions of the lens contour of the microlenses arranged in one of the microlens array units is shifted by a certain angle from the vertex directions of the lens contour of the microlenses arranged in the other of the microlens array units.

Figure 14:
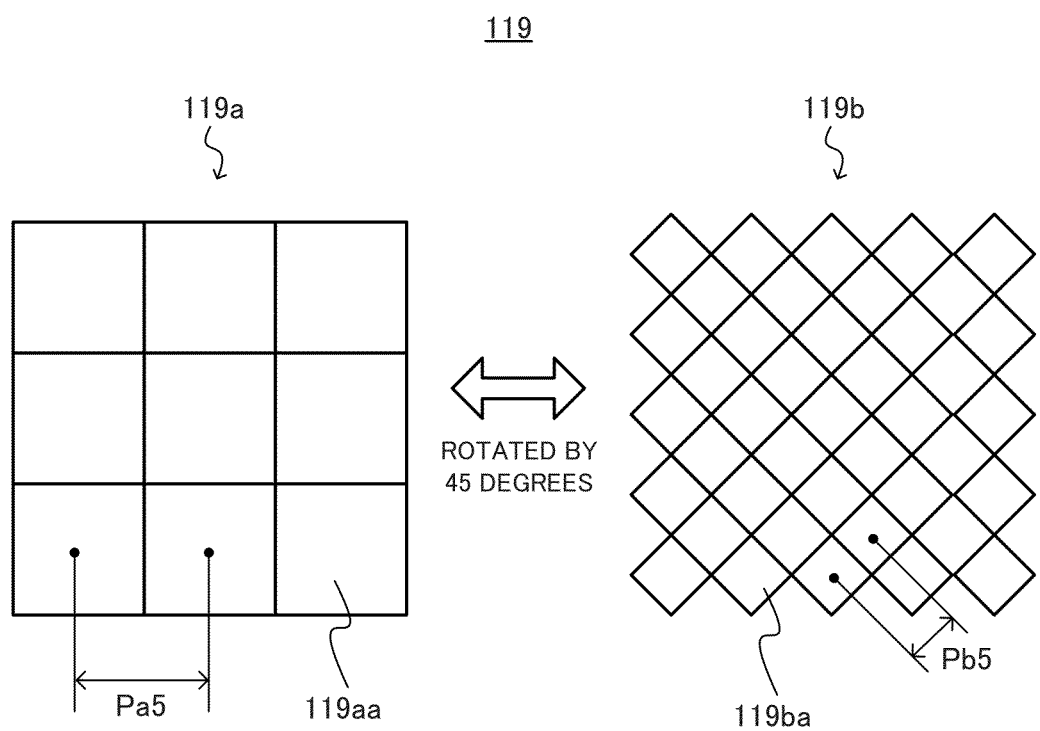
FIG. 14 shows a specific configuration of a screen according to another example of the sixth modified example.

FIG. 14 shows a specific configuration of the screen 119 according to another example of the sixth modified example. Specifically, FIG. 14 is a plan view of a magnified part of the first microlens array unit 119a and the second microlens array unit 119b of the screen 119, observed in the direction along the advancing direction of the light. It is noted that the light is incident on the side of the first microlens array unit 119a.

As shown in FIG. 14, there is an angle difference of 45 degrees between the vertex directions of the square shape which is the lens contour of the microlenses 119aa arranged in the first microlens array unit 119a and the vertex directions of the square shape which is the lens contour of the microlenses 119ba arranged in the second microlens array unit 119b. Namely, the plural microlenses 119aa, 119ba are arranged in the first microlens array unit 119a and the second microlens array unit 119b such that the square shapes which are the lens contours of the microlenses 119aa, 119ba have the relation of being rotated by 45 degrees relative to each other.

Also, the first microlens array unit 119a and the second microlens array unit 119b are configured such that the lens pitch Pb5 of the microlenses 119ba of the second microlens array unit 119b is smaller than the lens pitch Pa5 of the microlenses 119aa of the first microlens array unit 119a (e.g., equal to or smaller than "½"). Further, the first microlens array unit 119a and the second microlens array unit 119b are arranged opposite to each other with a distance which is at least longer than the focal length of the microlens 119aa of the first microlens array unit 119a. In this case, to the first microlens array unit 119a and the second microlens array unit 119b, the arrangement relation indicated by one of the embodiment and the first and second modified examples described above (see FIG. 3A, FIG. 6, FIG. 7, FIG. 8) is applied. Or, the first microlens array unit 119a and the second microlens array unit 119b are integrated as a single unit as shown by the third modified example (see FIG. 9).

The screen 119 according to another example of the sixth modified example has the same operation and effect as the screen 11 according to the embodiment and the screen 115 according to the fourth modified example described above.

7th Modified Example

Similarly to the screen according to the sixth modified example, the screen according to the seventh modified example is configured by the first and second microlens array unit having the microlenses having the lens contour of a square shape. However, the screen according to the seventh modified example differs from the screen according to the sixth modified example in its arrangement of the microlenses of the square shape.

Figure 15:
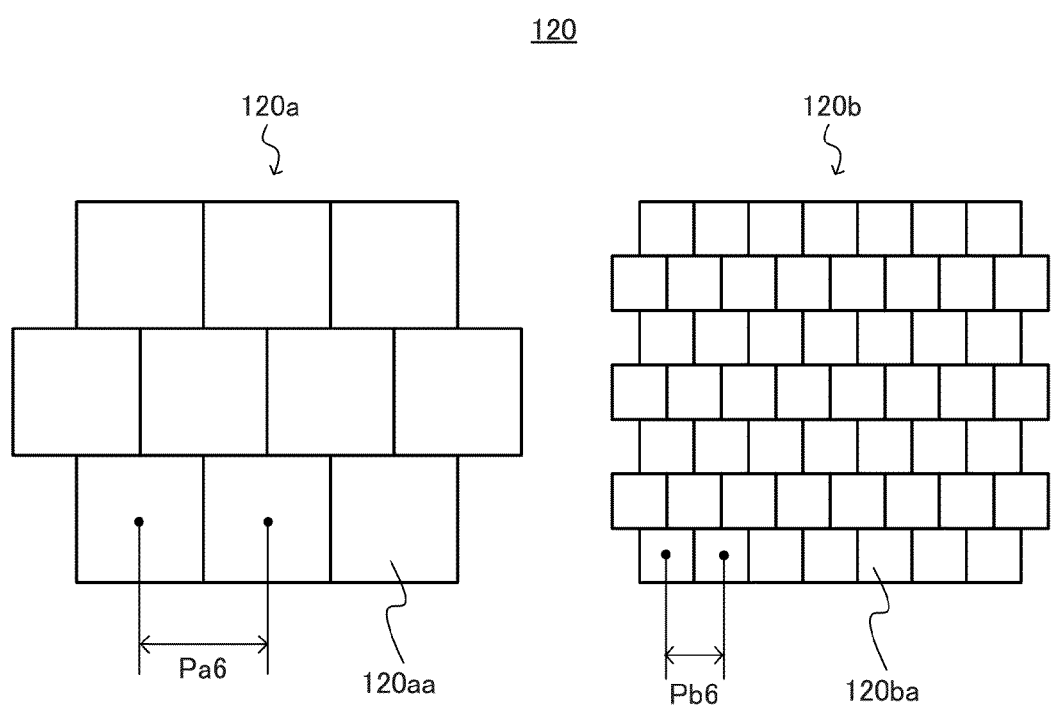
FIG. 15 shows a specific configuration of a screen according to a seventh modified example.

FIG. 15 shows a specific configuration of the screen 120 according to the seventh modified example. Specifically, FIG. 15 is a plan view of a magnified part of the first microlens array unit 120a and the second microlens array unit 120b of the screen 120, observed in the direction along the advancing direction of the light. It is noted that the light is incident on the side of the first microlens array unit 120a.

As shown in FIG. 15, the first microlens array unit 120a and the second microlens array unit 120b are formed by the plural microlenses 120aa, 120ba, respectively, each having a lens contour of the square shape in a plan view. Specifically, the first microlens array unit 120a and the second microlens array unit 120b are configured such that the microlenses 120aa, 120ba neighboring in the up-down direction are arranged with a shift of a half length of a side of the square shape.

Also, the first microlens array unit 120a and the second microlens array unit 120b are configured such that the lens pitch Pb6 of the microlenses 120ba of the second microlens array unit 120b is smaller than the lens pitch Pa6 of the microlenses 120aa of the first microlens array unit 120a (e.g., equal to or smaller than "½"). Further, the first microlens array unit 120a and the second microlens array unit 120b are arranged opposite to each other with a distance which is at least longer than the focal length of the microlens 120aa of the first microlens array unit 120a. In this case, to the first microlens array unit 120a and the second microlens array unit 120b, the arrangement relation indicated by one of the embodiment and the first and second modified examples described above (see FIG. 3A, FIG. 6, FIG. 7, FIG. 8) is applied. Or, the first microlens array unit 120a and the second microlens array unit 120b are integrated as a single unit as shown by the third modified example (see FIG. 9).

The screen 120 according to the seventh modified example has the same operation and effect as the screen 11 according to the embodiment described above.

The configuration shown in the fourth modified example described above may be applied to the screen according to the seventh modified example. Namely, the first and second microlens array units formed by the lens contour of the square shape as shown in FIG. 15 may be arranged such that the vertex directions of the lens contour of the microlenses arranged in one of the microlens array units is shifted by a certain angle from the vertex directions of the lens contour of the microlenses arranged in the other of the microlens array units.

Figure 16:
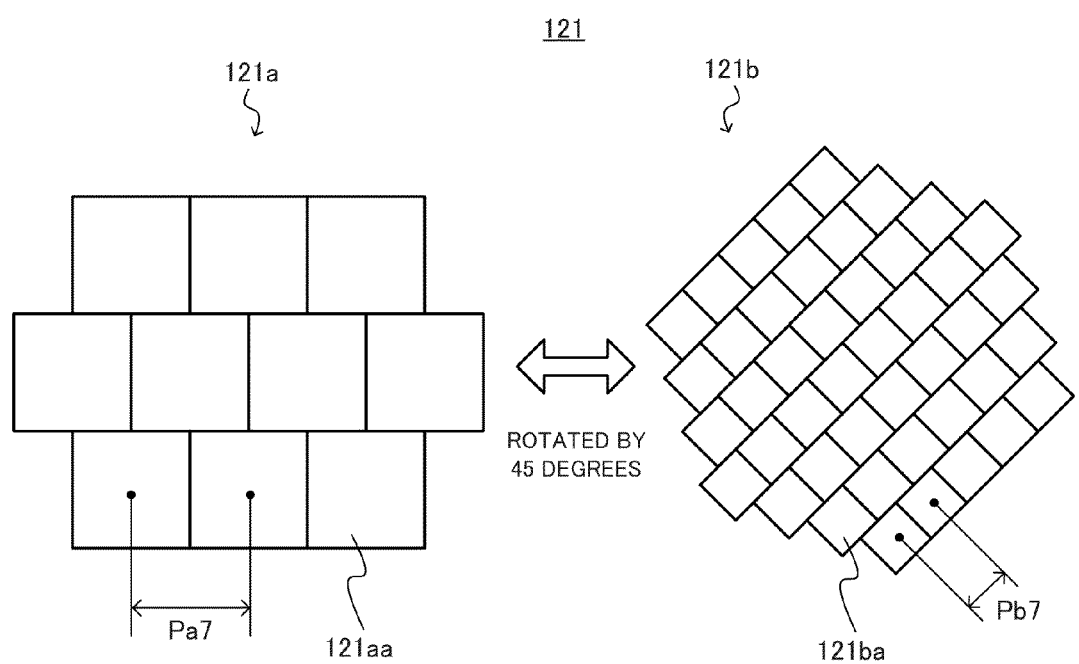
FIG. 16 shows a specific configuration of a screen according to another example of the seventh modified example.

FIG. 16 shows a specific configuration of the screen 121 according to another example of the seventh modified example. Specifically, FIG. 16 is a plan view of a magnified part of the first microlens array unit 121a and the second microlens array unit 121b of the screen 121, observed in the direction along the advancing direction of the light. It is noted that the light is incident on the side of the first microlens array unit 121a.

As shown in FIG. 16, there is an angle difference of 45 degrees between the vertex directions of the square shape which is the lens contour of the microlens 121aa arranged in the first microlens array unit 121a and the vertex directions of the square shape which is the lens contour of the microlens 121ba arranged in the second microlens array unit 121b. Namely, the plural microlenses 121aa, 121ba are arranged in the first microlens array unit 121a and the second microlens array unit 121b such that the square shapes which are the lens contours of the microlenses 121aa, 121ba have the relation of being rotated by 45 degrees relative to each other.

Also, the first microlens array unit 121a and the second microlens array unit 121b are configured such that the lens pitch Pb7 of the microlenses 121ba of the second microlens array unit 121b is smaller than the lens pitch Pa7 of the microlenses 121aa of the first microlens array unit 121a (e.g., equal to or smaller than "½"). Further, the first microlens array unit 121a and the second microlens array unit 121b are arranged opposite to each other with a distance which is at least longer than the focal length of the microlens 121aa of the first microlens array unit 121a. In this case, to the first microlens array unit 121a and the second microlens array unit 121b, the arrangement relation indicated by one of the embodiment and the first and second modified examples described above (see FIG. 3A, FIG. 6, FIG. 7, FIG. 8) is applied. Or, the first microlens array unit 121a and the second microlens array unit 121b are integrated as a single unit as shown by the third modified example (see FIG. 9).

The screen 121 according to another example of the seventh modified example has the same operation and effect as the screen 11 according to the embodiment and the screen 115 according to the fourth modified example described above.

In the sixth and seventh modified examples, the angle difference of the vertex directions of the square shapes, which are the lens contours of the first and second microlens array units, is 45 degrees. However, the angle difference is not necessarily strictly 45 degrees, and may be different from 45 degrees. The reason is as described in the section [Operation and Effect of Screen] of the embodiment described above. However, according to experiments, it is known that the effect of suppressing the unnecessary interference by the image of the square shape at the light-incident plane is large when the angle difference of the vertex directions of the square shapes being the lens contours is nearly 45 or 135 degrees. Therefore, it is desired that the angle difference of the vertex directions of the square shapes, which are the lens contours of the first and second microlens array units, is nearly 45 or 135 degrees.

While the lens contour of the microlenses is the square shape in the sixth and seventh modified examples, the present invention is not limited to this. As described in the fifth modified example, the lens contour of the microlens may be a nearly square shape (e.g., a rectangle shape).

8th Modified Example

The screens according to the embodiment and the first to seventh modified examples described above are configured by the first and second microlens array units having the microlenses whose lens contour is a regular hexagon shape (including a nearly regular hexagon shape) or a square shape (including a nearly square shape). In contrast, the screen according to the eighth modified example is configured by the first and second microlens array units having the microlenses whose lens contour is a circle.

Figure 17:
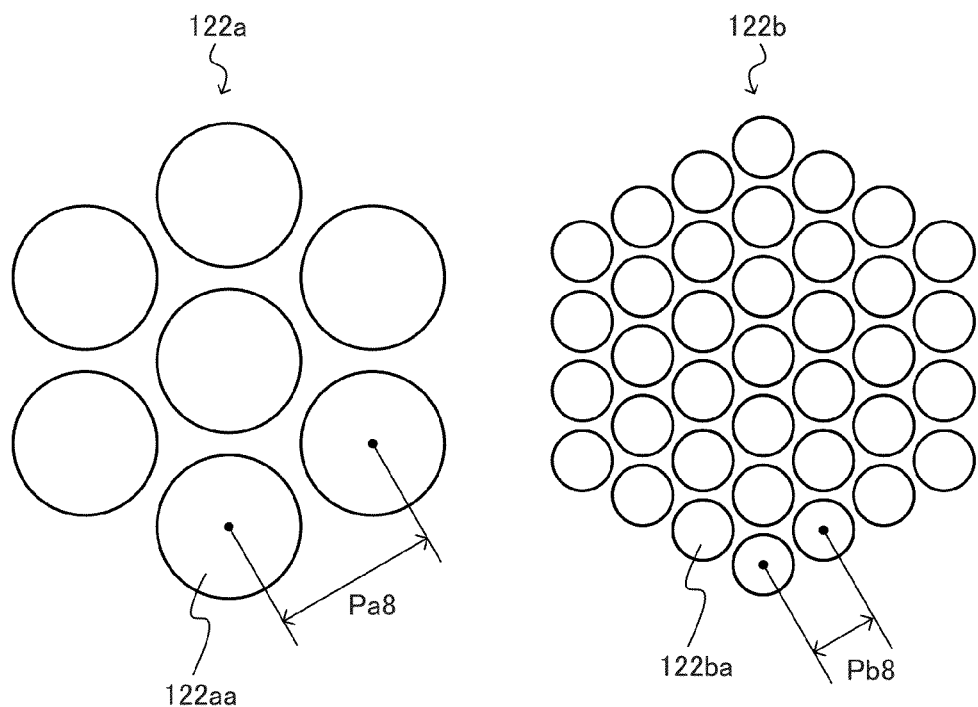
FIG. 17 shows a specific configuration of a screen according to an eighth modified example.

FIG. 17 shows a specific configuration of the screen 122 according to the eighth modified example. Specifically, FIG. 17 is a plan view of a magnified part of the first microlens array unit 122a and the second microlens array unit 122b of the screen 122, observed in the direction along the advancing direction of the light. It is noted that the light is incident on the side of the first microlens array unit 122a.

As shown in FIG. 17, the first microlens array unit 122a and the second microlens array unit 122b are formed by the plural microlenses 122aa, 122ba, respectively, each having a lens contour of a circle shape in a plan view. Specifically, in the first and second microlens array units 122a, 122b, plural microlenses 122aa, 122ba are arranged with equal intervals. The microlenses 122a, 122ba are arranged around one microlens with every predetermined angle. FIG. 17 shows an example in which the predetermined angle is 60 degrees.

Also, the first microlens array unit 122a and the second microlens array unit 122b are configured such that the lens pitch Pb8 of the microlenses 122ba of the second microlens array unit 122b is smaller than the lens pitch Pa8 of the microlenses 122aa of the first microlens array unit 122a (e.g., equal to or smaller than "½"). Further, the first microlens array unit 122a and the second microlens array unit 122b are arranged opposite to each other with a distance which is at least longer than the focal length of the microlenses 122aa of the first microlens array unit 122a. In this case, to the first microlens array unit 122a and the second microlens array unit 122b, the arrangement relation indicated by one of the embodiment and the first and second modified examples described above (see FIG. 3A, FIG. 6, FIG. 7, FIG. 8) is applied. Or, the first microlens array unit 122a and the second microlens array unit 122b are integrated as a single unit as shown by the third modified example (see FIG. 9).

The screen 122 according to the eighth modified example has the same operation and effect as the screen 11 according to the embodiment described above.

The configuration shown in the fourth modified example described above may be applied to the screen according to the eighth modified example. Namely, the first and second microlens array units formed by the lens contour of the square shape as shown in FIG. 17 may be arranged in a manner rotated by a predetermined angle relative to each other.

Figure 18:
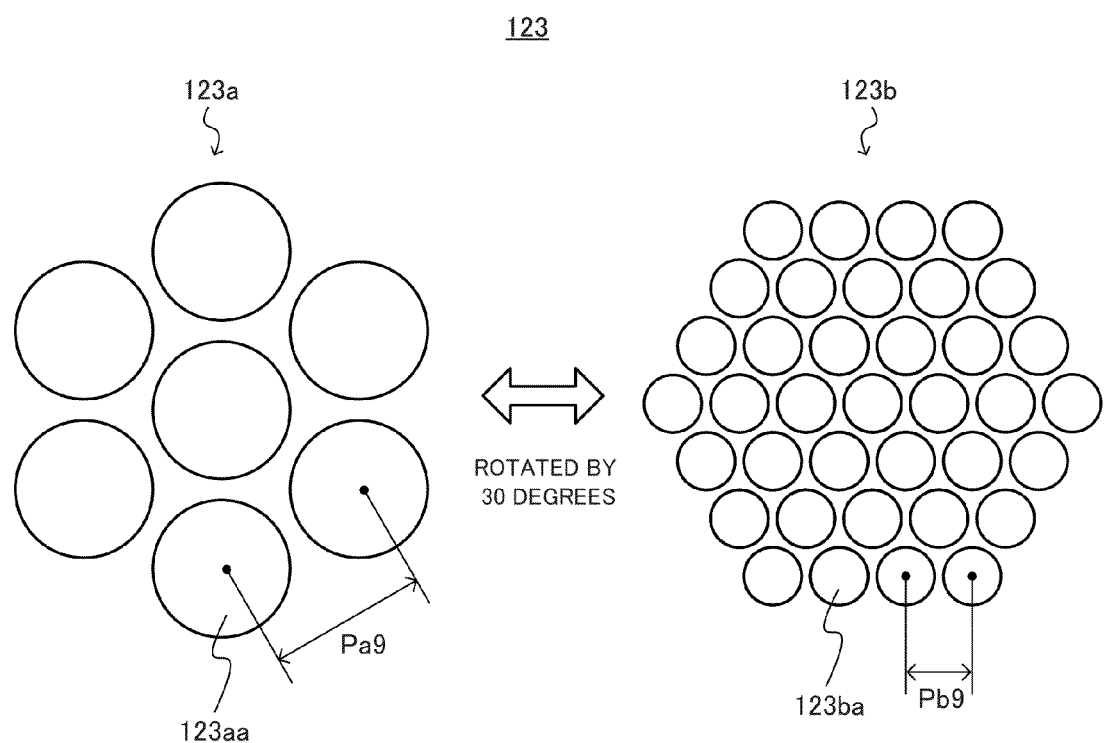
FIG. 18 shows a specific configuration of a screen according to another example of the eighth modified example.

FIG. 18 shows a specific configuration of the screen 123 according to another example of the eighth modified example. Specifically, FIG. 18 is a plan view of a magnified part of the first microlens array unit 123a and the second microlens array unit 123b of the screen 123, observed in the direction along the advancing direction of the light. It is noted that the light is incident on the side of the first microlens array unit 123a.

As shown in FIG. 18, the microlenses 123aa arranged in the first microlens array unit 123a and the microlenses 123ba arranged in the second microlens array unit 123b are rotated relatively to each other by 30 degrees, which is a half of the predetermined angle, with respect to one microlens. Also, the first microlens array unit 123a and the second microlens array unit 123b are configured such that the lens pitch Pb9 of the microlenses 123ba of the second microlens array unit 123b is smaller than the lens pitch Pa9 of the microlenses 123aa of the first microlens array unit 123a (e.g., equal to or smaller than "½"). Further, the first microlens array unit 123a and the second microlens array unit 123b are arranged opposite to each other with a distance which is at least longer than the focal length of the microlens 123aa of the first microlens array unit 123a. In this case, to the first microlens array unit 123a and the second microlens array unit 123b, the arrangement relation indicated by one of the embodiment and the first and second modified examples described above (see FIG. 3A, FIG. 6, FIG. 7, FIG. 8) is applied. Or, the first microlens array unit 123a and the second microlens array unit 123b are integrated as a single unit as shown by the third modified example (see FIG. 9).

The screen 123 according to another example of the eighth modified example has the same operation and effect as the screen 11 according to the embodiment and the screen 115 according to the fourth modified example described above.

In the eighth modified example, it is preferred to mask the spaces between the microlenses of the first and second microlens array units so that the light does not pass the spaces.

The lens contour of the microlens is not limited to the circle shape. As described in the fifth modified example, the lens contour of the microlens may be a nearly circle shape (e.g., an elliptical shape). Further, the first and second microlens array units are not limited to the relation rotated by 30 degrees as shown in FIG. 18.

9th Modified Example

While the above description is directed to the examples in which the present invention is applied to a head-up display, the application of the present invention is not limited to this. Other than the head-up display, the present invention may be applied to a laser projector. Since speckle noise normally becomes a problem in the laser projector, it is not desired to use a screen for a liquid crystal projector. As described above, since the screen according to the present invention can appropriately suppress the speckle noise and sufficiently ensure a viewing angle, the screen according to the present invention is preferably applied to the laser projector.

In addition, the present invention can be applied to a head mount display, other than the head-up display and the laser projector.

Industrial Applicability

This invention can be used for an image display apparatus such as a head-up display, a head mount display and a laser projector.

DESCRIPTION OF REFERENCE NUMERALS

1 Image display apparatus
11 Screen
11a First microlens array unit
11b Second microlens array unit
11aa, 11ba Microlens

The invention claimed is:
1. A light source unit comprising:
a light source; and
an optical element comprising a first microlens array unit and a second microlens array unit in each of which plural microlenses are arranged,
wherein the first microlens array unit and the second microlens array unit are arranged opposite to each other with a distance longer than a focal length of the microlenses arranged in the first microlens array unit,
wherein an interval of the microlenses arranged in the second microlens array unit is narrower than an interval of the microlenses arranged in the first microlens array unit,
wherein the first microlens array unit is arranged on a light-incident side of a light emitted by the light source with respect to the second microlens array unit,
wherein the first microlens array unit and the second microlens array unit are arranged such that the light emitted by the first microlens array unit is directly incident on the second microlens array unit, wherein the intervals between the microlenses arranged in the first microlens array unit and the second microlens array unit are set such that the light focused by one microlens in the first microlens array unit is incident on and divided by two or more microlenses in the second microlens array unit, and wherein the light focused by two neighboring ones of the microlenses in the first microlens array unit is incident upon a same one of the microlenses in the second microlens array unit.

2. The light source unit according to claim 1, wherein the interval between the microlenses arranged in the second microlens array unit is equal to or smaller than ½ of the interval between the microlenses arranged in the first microlens array unit.

3. The light source unit according to claim 1, wherein the interval between the microlenses is an interval between centers of gravity of neighboring microlenses.

4. The light source unit according to claim 1, wherein the first microlens array unit and the second microlens array unit are arranged opposite to each other at positions apart from each other by a distance which is equal to or larger than 1.5 times and equal to or smaller than 3 times of the focal length of the microlens arranged in the first microlens array unit.

5. The light source unit according to claim 1,
wherein the plural microlenses are formed to have a lens contour of a polygon shape in a plan view, and
wherein the first microlens array unit and the second microlens array unit are configured such that vertex directions of the lens contour of the microlenses arranged in the first microlens array unit is shifted by a certain angle from vertex directions of the lens contour of the microlenses arranged in the second microlens array unit.

6. The light source unit according to claim 5,
wherein the polygon shape is a regular hexagon shape, and
wherein an angle difference between the vertex directions of the lens contour of the microlenses arranged in the first microlens array unit and the vertex directions of the lens contour of the microlenses arranged in the second microlens array unit is substantially 30 degrees or 90 degrees.

7. The light source unit according to claim 5,
wherein the polygon shape is a square shape, and
wherein an angle difference between the vertex directions of the lens contour of the microlenses arranged in the first microlens array unit and the vertex directions of the lens contour of the microlenses arranged in the second microlens array unit is substantially 45 degrees or 135 degrees.

8. The light source unit according to claim 1,
wherein each of the plural microlenses has the lens contour of a regular polygon shape in a plan view, and
wherein the first microlens array unit and the second microlens array unit are configured such that the vertex directions of the lens contour of the microlenses arranged in the first microlens array unit and the vertex directions of the lens contour of the microlenses arranged in the second microlens array unit are shifted from each other by ½ of an interior angle of the regular polygon shape.

9. The light source unit according to claim 1,
wherein the plural microlenses are arranged with equal intervals in the first microlens array unit and the second microlens array unit, wherein the microlenses are arranged such that one microlens is surrounded by plural microlenses at every predetermined angle with respect to vertexes of said one microlens, and wherein the microlenses arranged in the first microlens array unit and the microlenses arranged in the second microlens array unit are shifted by a half of the predetermined angle with respect to said one microlens.

10. The light source unit according to claim 9, wherein spaces between the microlenses in the first microlens array unit and the second microlens array unit are masked to be intransparent.

11. The light source unit according to claim 1, wherein the optical element comprises a first lens array including the first microlens array unit on one surface;
and a second lens array including the second microlens array unit on one surface.

12. The light source unit according to claim 11, wherein the first microlens array unit and the second microlens array unit are formed on the surfaces of the first lens array and the second lens array opposite to each other.

13. The light source unit according to claim 11, wherein the first microlens array unit is formed on one of the surfaces of the first lens array that is not opposite to the surface of the second lens array on which the second microlens array unit is formed.

14. The light source unit according to claim 11, wherein the first microlens array unit and the second microlens array unit are formed on the surfaces of the first lens array and the second lens array not opposite to each other.

15. The light source unit according to claim 1, wherein the first microlens array unit is formed on one surface and the second microlens array unit is formed on the other surface.

16. A head-up display comprising a light source unit which makes a user view an image formed by the light source unit from a position of eyes of the user as a virtual image, the light source unit comprising:
a light source; and
an optical element comprising a first microlens array unit and a second microlens array unit in which plural microlenses are arranged,
wherein the first microlens array unit and the second microlens array unit are arranged opposite to each other with a distance longer than a focal length of the microlenses arranged in the first microlens array unit,
wherein an interval of the microlenses arranged in the second microlens array unit is narrower than an interval of the microlenses arranged in the first microlens array unit,
wherein the first microlens array unit is arranged on a light-incident side of a light emitted by the light source with respect to the second microlens array unit,
wherein the first microlens array unit and the second microlens array unit are arranged such that the light emitted by the first microlens array unit is directly incident on the second microlens array unit, and
wherein the intervals between the microlenses arranged in the first microlens array unit and the second microlens array unit are set such that the light focused by one microlens in the first microlens array unit is incident on and divided by two or more microlenses in the second microlens array unit.

* * * * *